United States Patent [19]
Hays et al.

[11] 3,809,989
[45] May 7, 1974

[54] TORSIONAL STEPPING MOTOR AND EXCITER APPARATUS THEREFOR

[75] Inventors: John D. Hays, Troy; Harlen L. Baswell; Jerry A. Combs, both of Dayton; Dale G. Brown, West Carrollton, all of Ohio

[73] Assignee: The National Cash Register Company, Dayton, Ohio

[22] Filed: Oct. 12, 1971

[21] Appl. No.: 188,420

[52] U.S. Cl. .................... 318/696, 318/685, 310/49
[51] Int. Cl. ........................................... H02n 29/02
[58] Field of Search .......... 318/696, 685, 138, 254; 101/93; 310/49; 317/DIG. 6; 323/45 ER

[56] References Cited
UNITED STATES PATENTS

| | | | |
|---|---|---|---|
| 3,495,149 | 2/1970 | Swain | 318/138 |
| 3,418,541 | 12/1968 | Adams | 317/DIG. 6 |
| 3,019,374 | 1/1962 | Ladd | 317/DIG. 6 |
| 3,466,528 | 9/1969 | Adams | 321/45 |
| 3,327,200 | 6/1967 | Corey | 321/45 ER |
| 3,697,839 | 10/1972 | Unnewehr | 318/138 |
| 3,453,514 | 7/1969 | Rakess et al. | 318/138 |
| 3,364,407 | 1/1968 | Hill | 318/138 |
| 3,560,818 | 2/1971 | Amato | 318/138 |
| 3,444,447 | 5/1969 | Newell | 318/696 |
| 3,401,323 | 9/1968 | French | 318/696 |
| 3,560,817 | 2/1971 | Amato | 318/138 |
| 3,584,273 | 6/1971 | Massar | 318/138 |
| 3,560,821 | 2/1971 | Beling | 318/138 |
| 3,486,096 | 12/1969 | Van Cleave | 318/138 |
| 3,573,593 | 4/1971 | Beery | 318/696 |
| 3,402,334 | 9/1968 | Newton | 318/696 |

Primary Examiner—G. R. Simmons
Attorney, Agent, or Firm—John J. Callahan; J. T. Cavender; J. I. Cavender

[57] ABSTRACT

A stepping or indexing motor including plural electrical-to-mechanical energy transducer devices and a torsionally resilient coupling member for connecting transducer rotor members and for storing rotor member mechanical energy between rotor member movements; the torsionally resilient coupling member also providing starting torque for the stepping motor, and a means for separately driving the inertia component and the friction component of the stepping motor load; the torsionally resilient coupling member also providing a means for achieving high torque-to-inertia and torque-to-motor volume ratios in the motor. In one embodiment a transducer device takes the form of a rotor, a stator, and a winding carried at each end of the coupling member, with the output torque at a motor shaft being derived both from an adjacent transducer device and from energy stored in the torsionally resilient coupling member during a previous distorting of the coupling member; the alternate sequential energizing and deenergizing action subjecting the coupling member to a twisting action and a relaxing action during each step of operation. Electrical circuitry for controlling the flow of energy into the stepping motor and for removing energy from the motor magnetic circuit is also described along with a method for achieving a novel energy conserving release of rotor and stator magnetic engagement.

25 Claims, 24 Drawing Figures

INVENTORS
JOHN D. HAYS
HARLEN L. BASWELL
DALE G. BROWN &
JERRY A. COMBS

THEIR ATTORNEYS

INVENTORS
JOHN D. HAYS
HARLEN L. BASWELL
DALE G. BROWN &
JERRY A. COMBS

BY

THEIR ATTORNEYS

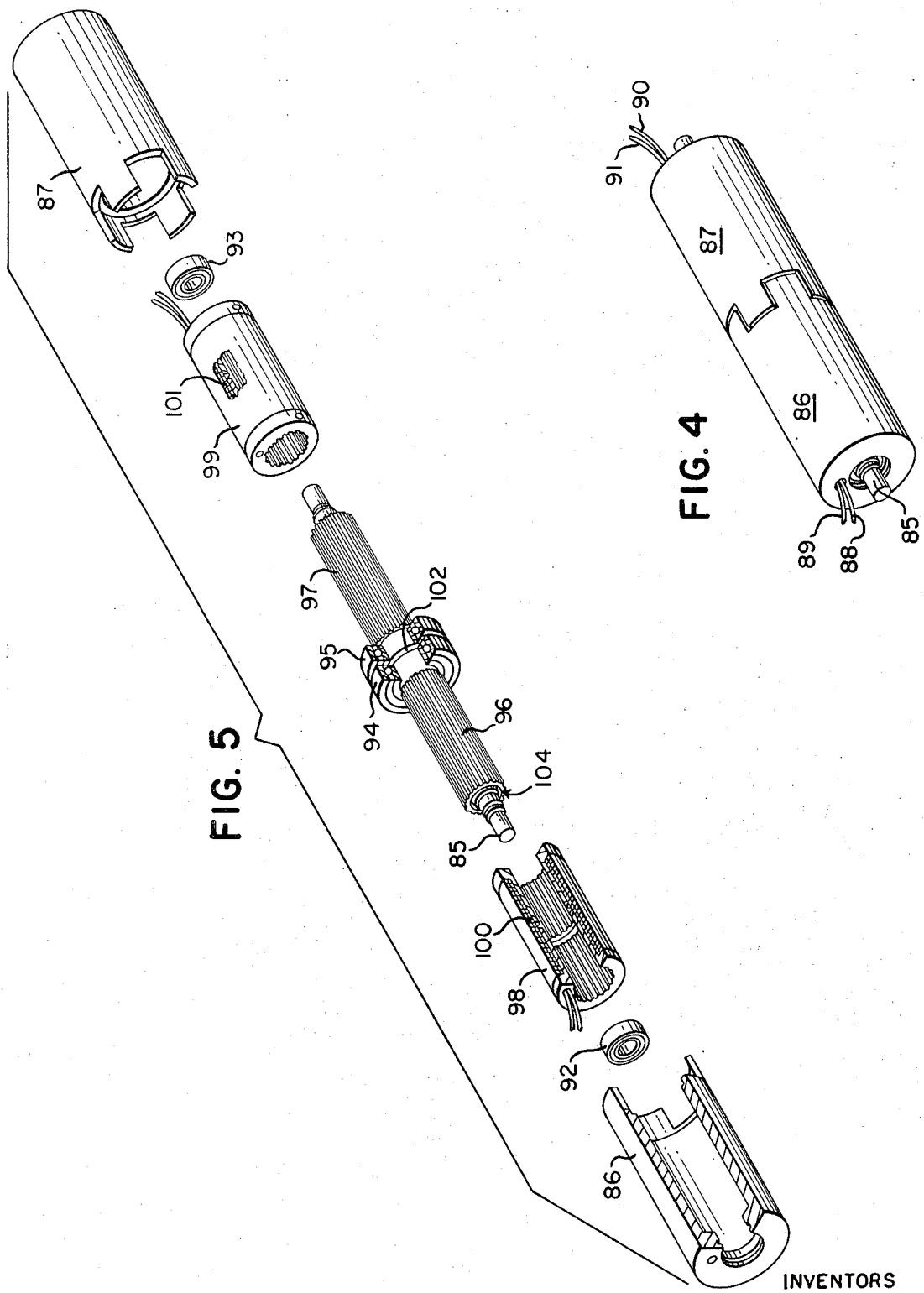

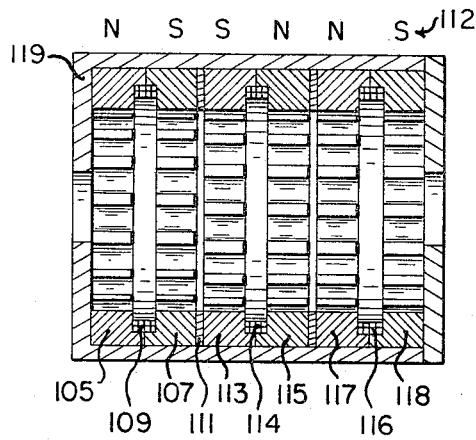
FIG. 6A
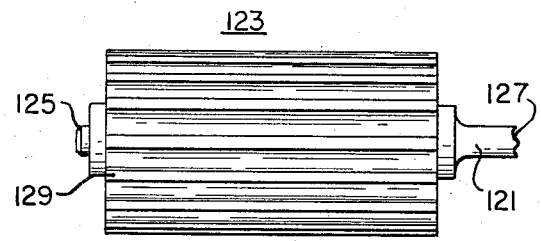
FIG. 6B
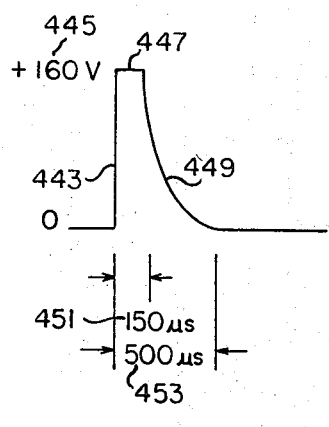
FIG. 10B
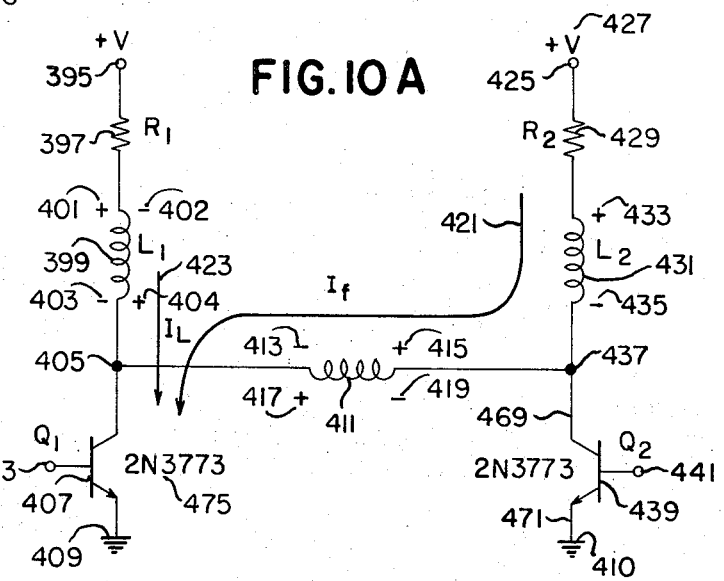
FIG. 10A
FIG. 10C

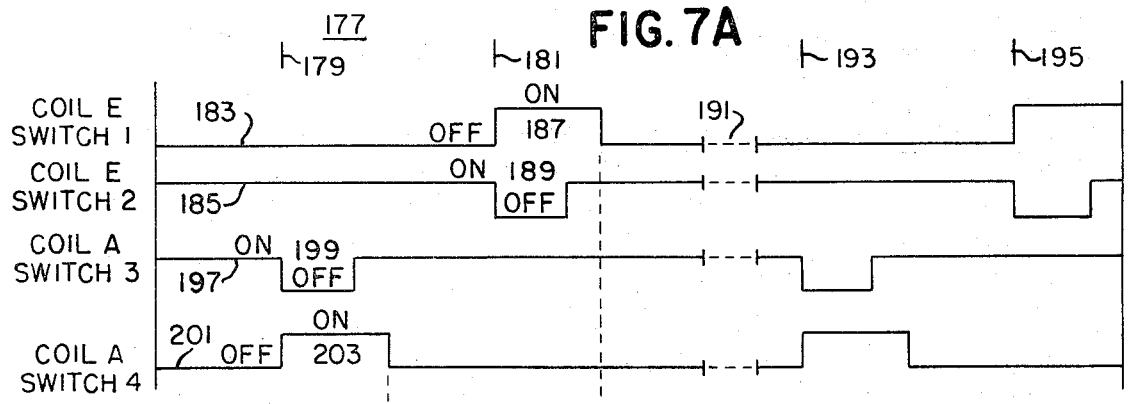
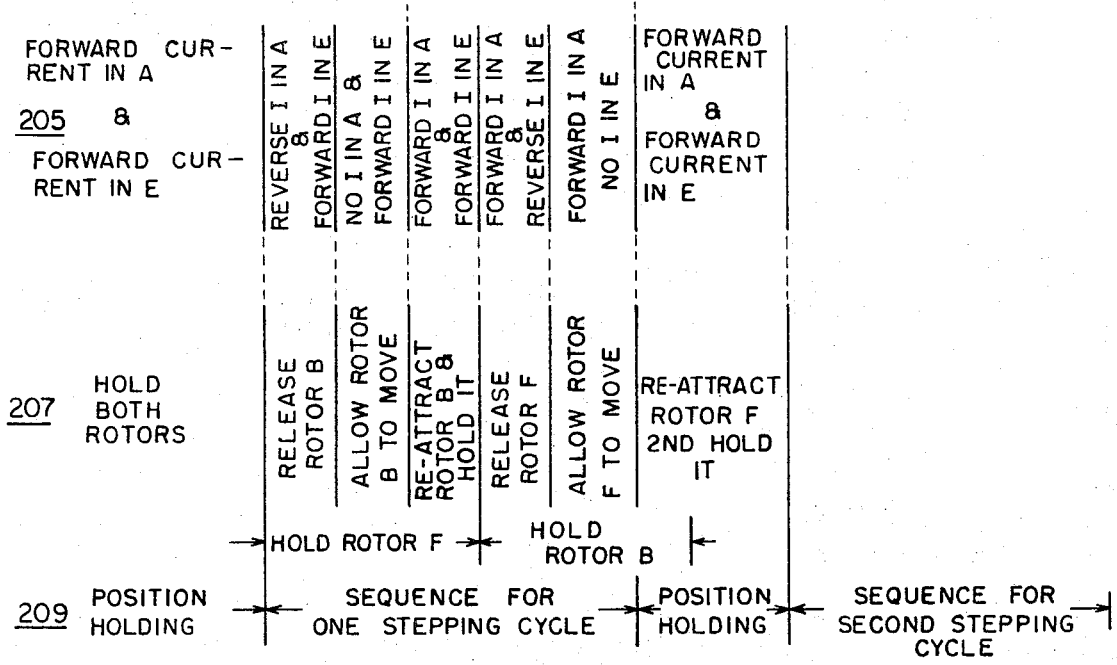
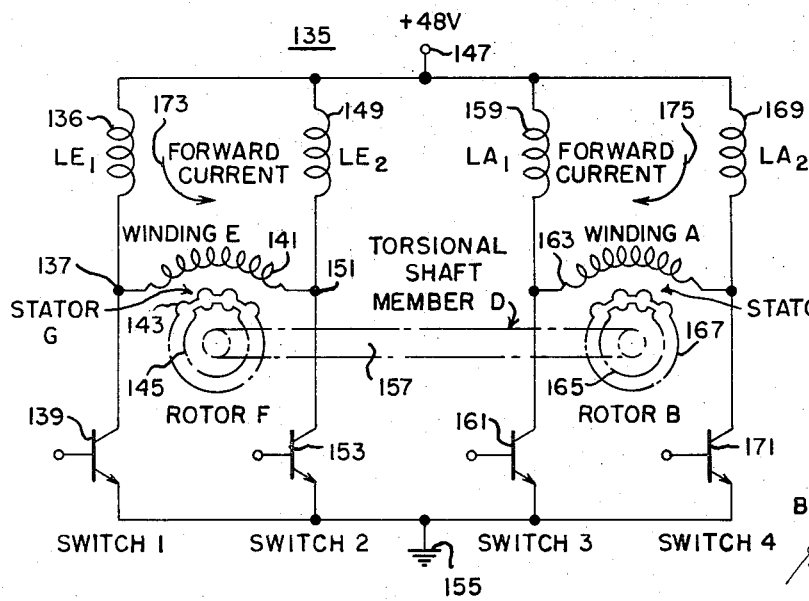

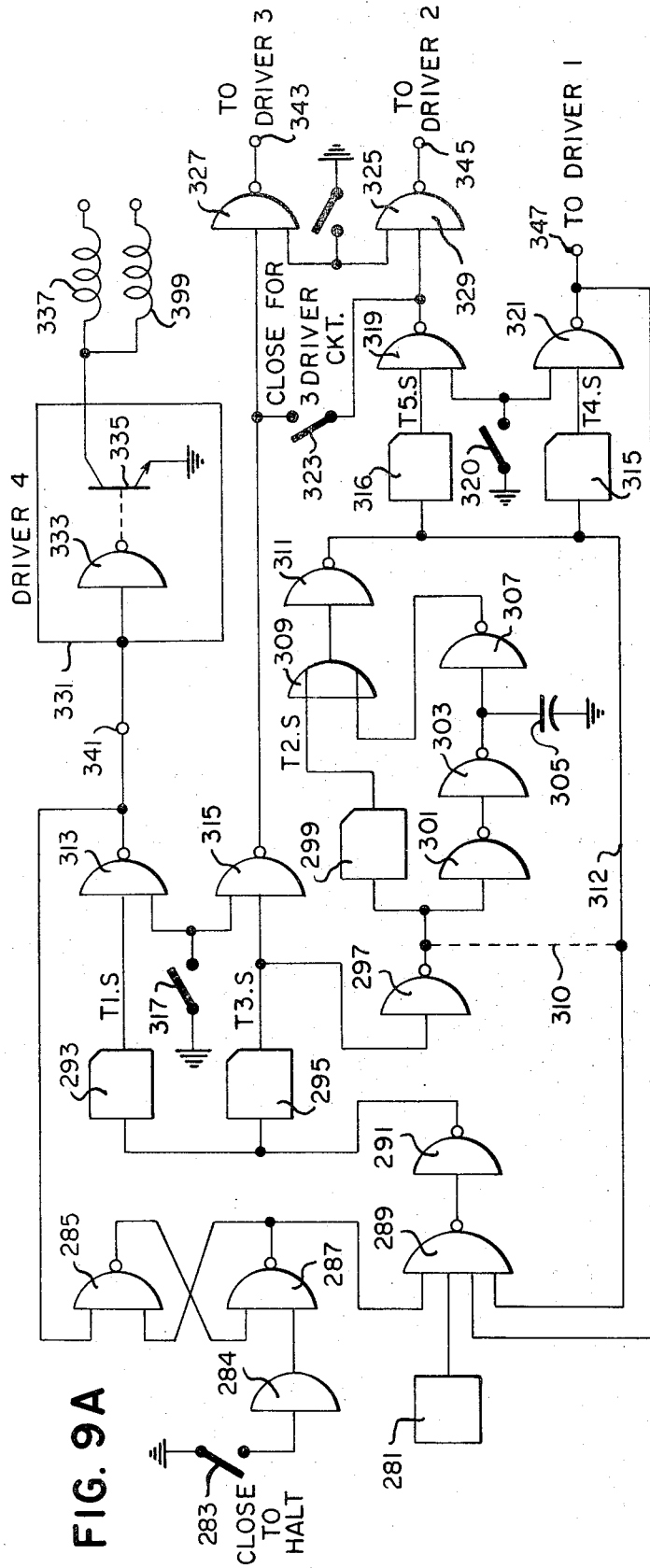

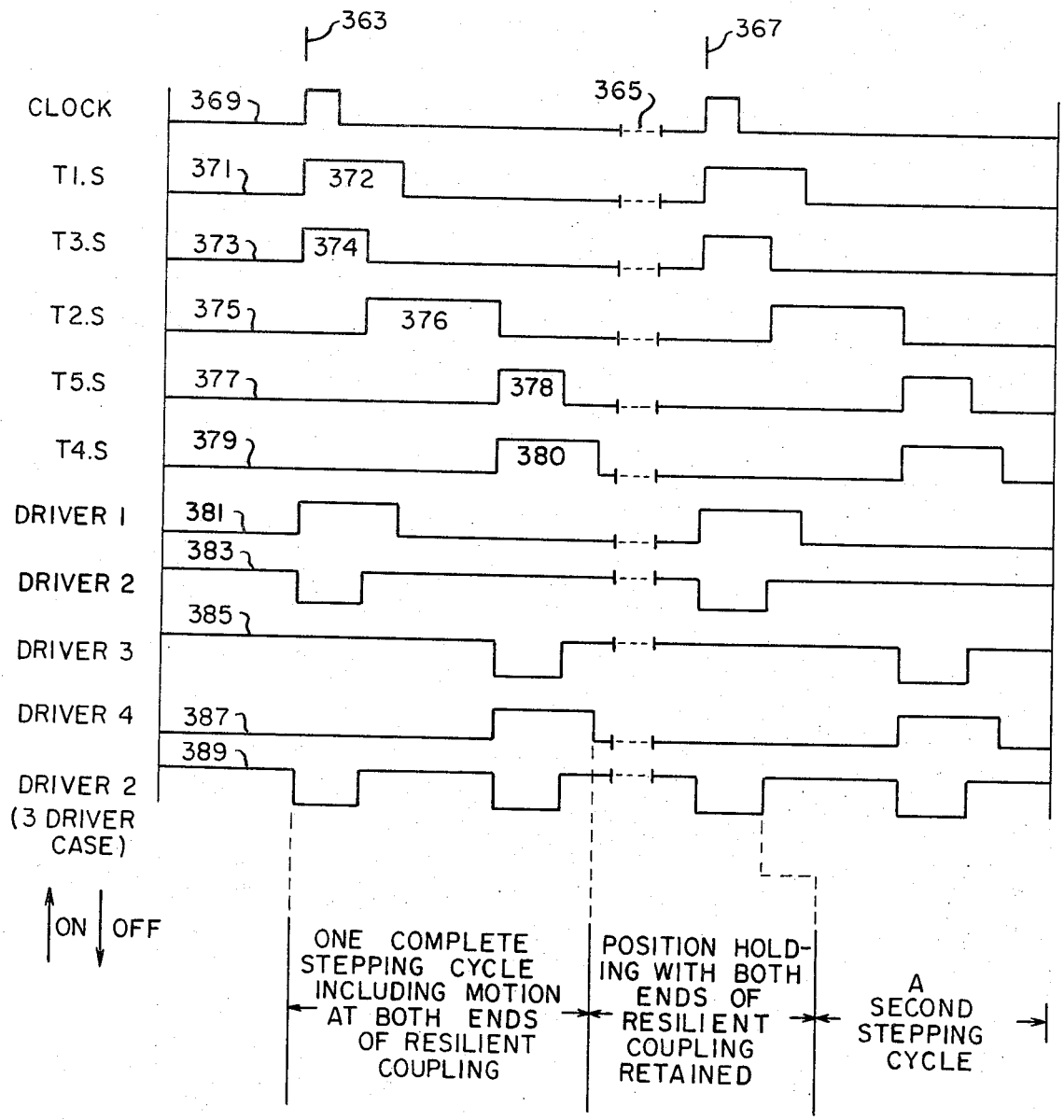

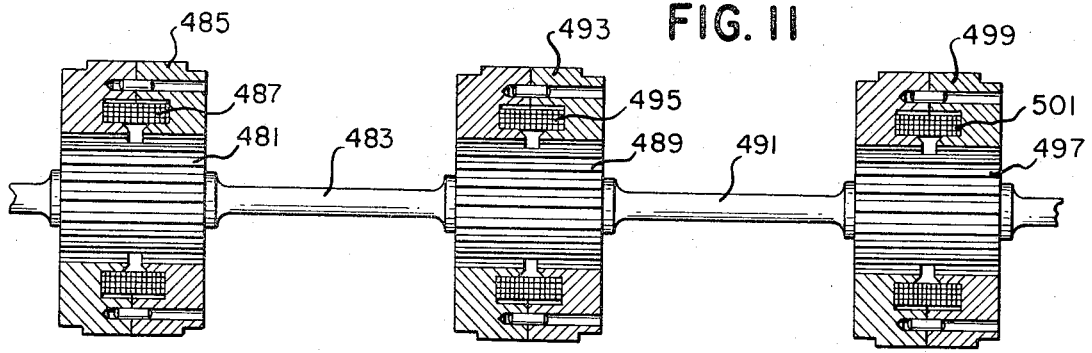
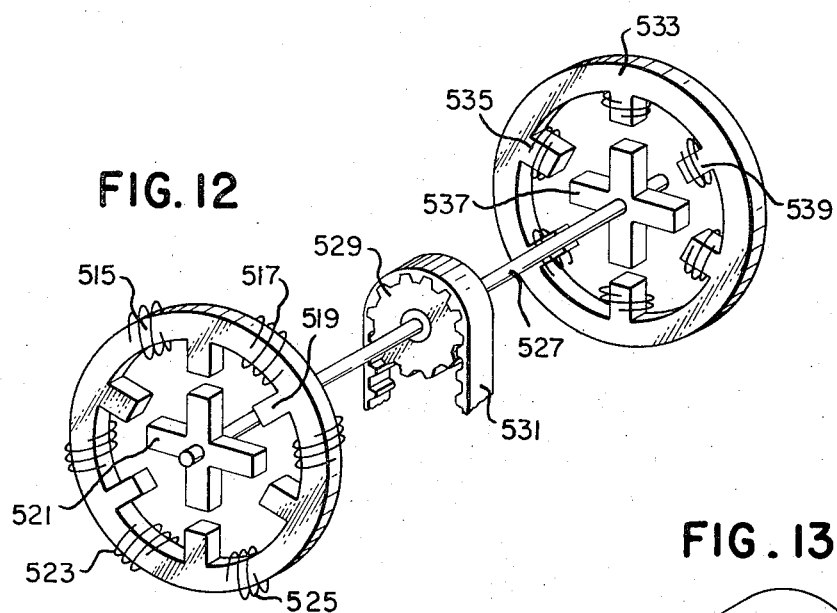
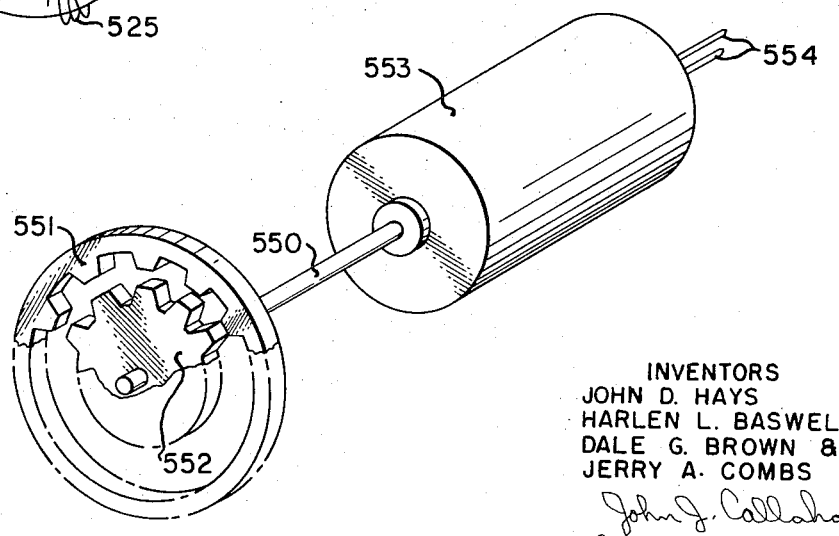
INVENTORS
JOHN D. HAYS
HARLEN L. BASWELL
DALE G. BROWN &
JERRY A. COMBS
BY
THEIR ATTORNEYS

TORSIONAL STEPPING MOTOR AND EXCITER APPARATUS THEREFOR

CROSS REFERENCE TO RELATED APPLICATIONS

The drawings and the detailed description of the invention portions of the present application are common to two applications for letters patent, application Ser. No. 188,419 filed Oct. 12, 1971 and the present application Ser. No. 188,420, filed Oct. 12, 1971, both assigned to The National Cash Register Company.

BACKGROUND OF THE INVENTION

This invention pertains to a stepping motor or incremental motion device of the type employing plural electrical-to-mechanical energy transducer devices with the separate transducers being connected by a torsionally resilient coupling member to form a single stepping motor or incremental motion device. The invention includes electrical circuitry preferably of the solid state electronic type for coordinated control of transducer excitation.

DESCRIPTION OF THE PRIOR ART

Stepping mechanisms or indexing mechanisms for driving transporting devices or advancing devices have been previously used where it is desirable to advance tapes, record material, films or the like in incremental manner and without the use of complex clutch and brake mechanisms. In recent years the use of stepping motors in processing data has become increasingly common because of the high speed operation and precise positioning of the driven member possible with a stepping motor; data processing uses of a stepping motor have been limited however by the relatively small output torque available from such motors in the prior art.

Several patents in the prior art contain structures which partially resemble various embodiments of the present invention; one example of such prior art is British Patent Number 989,172 issued on the application of Alan Stone and Electric and Musical Industries Ltd. on Apr. 14, 1965. In the Stone patent there is shown a two rotor stepping motor having the rotors mounted on a common shaft and magnetically engaged by two separate stators. The Stone patent differs from embodiments of the present invention in that the Stone rotors are rotationally displaced by less than one-half of the pole pitch while rotors in embodiments of the present invention are displaced by substantially one-half of the pole pitch. In the Stone patent, the rotor shaft is also rigid and massive while the shaft in embodiments of the present invention is torsionally resilient.

Another example of prior art partially resembling embodiments of the present invention is found in U.S. Pat. No. 3,143,674 issued on the application of G. V. Bond. The Bond patent also concerns a stepping motor having two rotors which are engaged by two separate stators. In the Bond patent, the stepping motor rotors are connected by differential gearing and are allowed to rotate only through a limited arc of rotation, this limited arc rotation being converted into continuous output shaft rotation by the use of a rotary ratchet and pawl mechanism. The Bond invention also includes a torsion bar used for restoring the rotors to their normal position following a limited arc rotation event. The Bond invention differs from the present invention by its necessary incorporation of the rachet and pawl mechansim, by its necessary incorporation of gears connecting the two rotors, by the use of a torsion shaft only for motor resetting and by the mounting of rotors on different but concentric shafts.

Other examples of prior art partially resembling embodiments of the present invention are found in a series of United States patents issued to William S. Touchman and to Leonard R. Harper and including U.S. Pat. Nos. 3,309,988; 3,389,843; 3,468,343; and 3,505,950 respectively. The Touchman and Harper inventions all involve a torsionally resilient shaft connected between multiple-toothed rotor members which are excited in intermittent fashion. The Touchman and Harper inventions differ from that of the present application in that they necessarily incorporate a source of continuous rotation mechanical energy (a motor) for driving the torsion shaft and also necessarily include apparatus for exciting the rotors and torsion shaft into mechanical resonance through periodic braking of the rotors.

Yet other examples of prior art mechanisms which partially resemble embodiments of the present invention are found in the series of patents issued to A. G. Thomas and including U.S. Pat. Nos. 2,578,648; 2,774,922; 2,782,354; 2,787,719; 2,808,556 and 2,830,246. Although each of these patents concerns a stepping motor having multiple rotors which are rotationally displaced from each other on a common shaft, none of these patents incorporates the torsionally resilient shaft or the principle of storing energy in a torsionally resilient shaft as found in the present invention.

Yet another example of prior art apparatus which partially resembles embodiments of the present invention found in an article published in the McGraw-Hill Company magazine Electronics on Aug. 3, 1970 at page 74. In this article, inventor Joseph Gaon describes a relay activating circuit which partially resembles excitation circuitry employed with stepping motors of the present invention. The Gaon circuit differs from that of the present invention by the absence of switching devices selected for having breakdown mode energy dissipating capability, by the positive limitation of Gaon's circuit to relay apparatus, by the limitation of components in Gaon's circuit to stated relative values and by the absence of apparatus in Gaon's circuit for providing reverse current capable of canceling residual magnetism in the excited magnetic structure.

While these examples of the prior art disclose particular constructions for stepping motors and related apparatus, they do not show the simple and low cost combination of torsionally resilient members coupling the rotors of two or more incremental motion electrical-to-mechanical transducer devices nor do they show this simple combination excited by mechanical energy conserving exciter apparatus.

SUMMARY OF THE INVENTION

The present invention relates to stepping motors and more particularly to a stepping motor having a torsion shaft which mechanically stores energy therein. An exciting winding is carried by each stator of the stepping motor, the winding being energized by a driver controller which supplies energy to the motor and initiates capture, hold and release events for the rotor teeth.

In operation of the stepping motor, the driver controller causes energy to be stored within the torsionally resilient coupling member by holding one rotor member in a fixed position while the other rotor member is moved against torque from the resilient coupling member into a stepping position.

The driver-controller is provided with capability for accomplishing a quick release of a rotor member from a stepping position in order that energy stored in the torsionally resilient coupling member be preserved and not dissipated by generator action occurring during a rotor release event. For accomplishing the quick release sequence, the driver-controller includes capability for rapid dissipation of energy stored in the motor electromagnetic structure and capability for canceling the residual magnetism flux in the motor structure.

In view of the above discussion, it is an object of the present invention to provide a stepping motor having very high torque output; the torque output being in some instances more than an order of magnitude increased over that of a similarly sized prior art stepping motor.

Another object of the present invention is to provide a stepping motor wherein mechanical energy is stored in a torsional shaft member during part of an operating cycle.

An additional object of the present invention is to provide a stepping motor wherein a portion of the output motion approximates simple harmonic motion.

A further object of the present invention is to provide a low cost stepping motor.

A further object of the present invention is to provide a double rotor stepping motor wherein the maximum torque generated by a first one of the rotors directly adds to the maximum torque generated by the second rotor even though the first and second rotors are rotationally displaced from each other on a common shaft and are not simultaneously engaged by stator members.

A further object of the present invention is to provide a stepping motor having large starting torque.

Still a further object of the present invention is to provide a stepping motor wherein the means employed for generating starting torque also provides useful load driving torque.

Still another object of the present invention is to provide a stepping motor wherein the rotor portion is highly damped while entering and being retained in a stepping position thereby providing a stepping motor having little oscillation or overshoot at each stepping position.

Still an additional object of the present invention is to provide in combination with an electrical circuit a torsional stepping motor wherein mechanical energy may be efficiently transferred between portions of the motor via a torsional element.

Still a further object of the present invention is to provide in combination with an electrical circuit a torsional stepping motor wherein the release of a rotor member from magnetic engagement with a stator member occurs within a small fraction of the time required for one cycle of mechanical oscillation in the rotor and torsional element combination.

Still another object of the present invention is to provide an electrical circuit capable of accomplishing rapid decay and reversal of magnetic flux in a ferromagnetic structure.

Still an additional object of the present invention is to provide an electrical circuit that is capable of both rapidly dissipating energy stored within the magnetic field of a ferromagnetic apparatus and of supplying additional energy for establishing a reverse magnetomotive force within the ferromagnetic apparatus, an apparatus wherein the change between energy dissipating and energy supplying functions occurs quickly.

Still a further object of the present invention is to provide an electrical circuit capable of performing the energy dissipating and energy supplying functions for a ferromagnetic apparatus while employing a minumum of component parts therein.

Still another object of the present invention is to provide a method for actuating a torsional stepping motor.

Still an additional object of the present invention is to provide a method for transferring energy into and within a torsional stepping motor.

And still a further object of the present invention is to provide a stepping motor exciting circuit capable of operating a stepping motor while inducing only small and slowly changing load transients into the motor power supply.

And a final object of the present invention is to provide a stepping motor wherein incremental motion of the rotor portion thereof results from the combination of energy stored in a torsionally resilient shaft and energy transferred during magnetic tooth attraction within the motor.

Additional advantages and features of the present invention will become apparent and fully understood from a reading of the following description taken together with the annexed drawings.

BRIEF DESCRIPTION OF THE DRAWINGS

In the drawings attached to the present specification:

FIG. 4 is a perspective view of another stepping motor made according to the present invention;

FIG. 5 is an exploded view of the FIG. 4 stepping motor;

FIG. 6 (including parts 6A and 6B) is a cross sectional and side view of a third stepping motor made according to the present invention;

FIG. 7 (including views 7A and 7B) is a first electrical schematic and waveform diagram describing an excitation circuit for stepping motors made according to the present invention;

FIG. 9 (including views 9A, 9B, and 9C) is an electrical schematic and waveform diagram describing a logical timing circuit for exciting a stepping motor made according to the present invention;

FIG. 10 (on the sheet with FIGS. 6A and 6B) and including views 10A, 10B, and 10C) is an electrical schematic and waveform diagram showing detailed operation of the circuitry shown in FIGS. 7 and 8;

FIG. 11 is a cross sectional diagrammatic view of a third stepping motor made according to the present invention;

FIG. 12 is a diagrammatic view of a fourth stepping motor made according to the present invention; and FIG. 13 is a diagrammatic view of a fifth stepping motor made according to the present invention.

DETAILED DESCRIPTION OF THE INVENTION

Introduction

Figure 1:
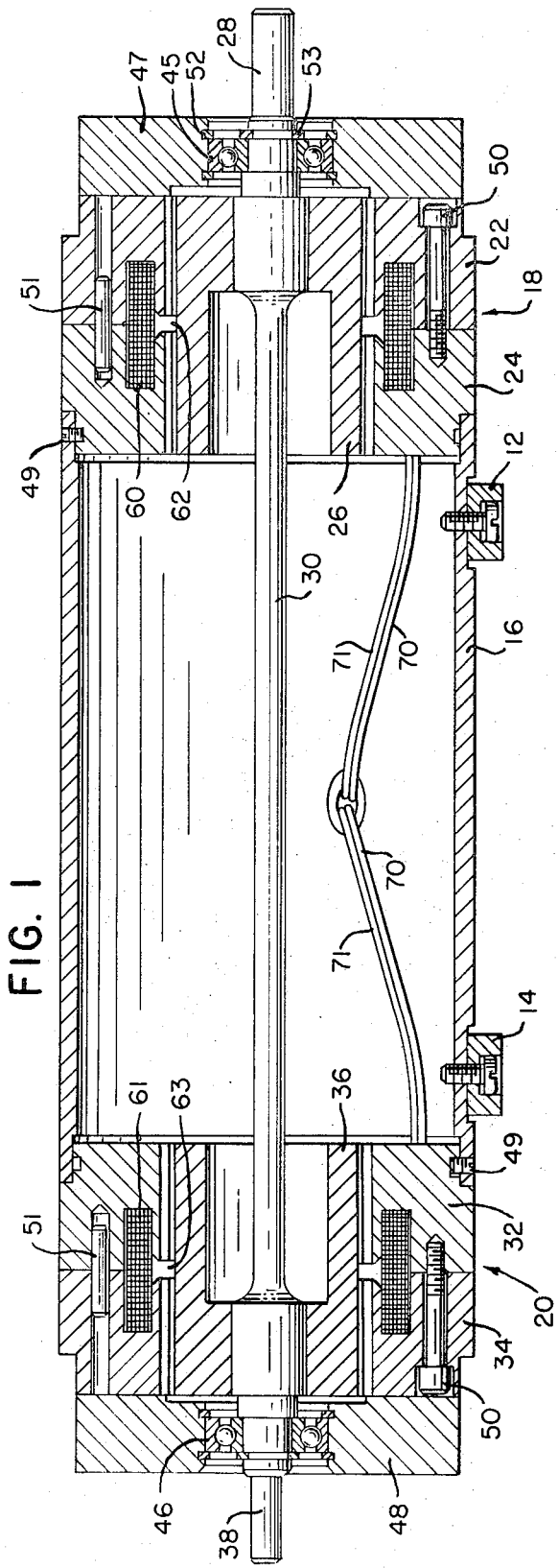
FIG. 1 is a cross sectional view of a stepping motor made according to the present invention.

One embodiment of a stepping motor made according to the present invention provides an output torque of 90 inch-pounds (1440 inch-ounces) while occupying substantially the same volume of space as the best available prior art stepping motor providing an output torque of 50 inch-ounces. The larger torque of the present invention stepping motor results from efficient magnetic engagement of 40 rotor-stator pole pairs in the stepping motor, as compared with only four rotor-stator pole pairs in the conventional motor, along with the addition of torque from two rotors at the stepping motor output shaft of the present motor. Since the present invention motor generates starting torque without the incorporation of rotor poles that are energized in a sequence of different time phases, the torque-to-inertia ratio of the present motor compares favorably with that of prior art stepping motors.

The structural elements needed to achieve the performance of the present torsional stepping motor are known in the prior magnetic and torsional pendulum arts; however, a successful combination of these structural elements into a practical torsional stepping motor has been absent because of the large losses of mechanical energy that have prevailed when magnetic flux was manipulated in an attempted stepping motor; mechanical energy loss, occurring when an engaged stepping motor rotor is released by slowly decaying magnetic flux, has been especially difficult to overcome, and this loss has obscured the performance benefits possible from an energy transferring torsionally resilient stepping motor apparatus.

Since the mechanical structure for transferring energy between portions of a torsional stepping motor, the electrical circuitry for initiating this transfer, and the method of cooperatively operating the mechanical structure and electrical circuitry are all important aspects of the present invention, the detailed description of the invention in this specification includes sections devoted to mechanical description of the invention, electrical description of the invention, and energy transfer description of the invention; the attached claims also concern each of these three areas of the invention.

In describing the present invention, the name stepping motor could properly be applied to either that apparatus located at one end of the torsionally resilient coupling member, (including a rotor, a stator, electrical windings, bearings, etc.) or to the complete assembly including two or more rotors, two or more stators, two or more sets of electrical windings and a torsionally resilient element. In the following specification, the phrase stepping motor is primarily used to describe that apparatus which includes a torsionally resilient element and two or more rotor-stator assemblies; in the claims portion of the application adherence to this convention is somewhat relaxed with the claim language being self explanatory. Where the name stepping motor is reserved for the combination of two or more magnetic devices with a torsionally resilient element, the name magnetic exciter or energy transducer or incremental motion rotary magnetic exciter or the names rotor member and stator member are employed to indicate the apparatus located at the ends of the torsionally resilient element.

MECHANICAL DESCRIPTION

Figure 2:
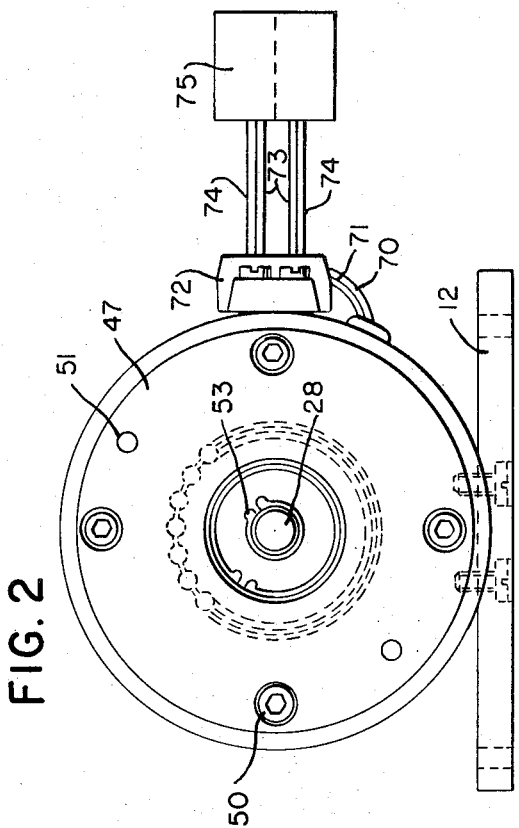
FIG. 2 is an end view taken from the right hand side of the motor shown in FIG. 1.

In FIGS. 1 and 2 of the drawings, there are shown two views, a sectional view and an end view of a stepping motor constructed according to the present invention; in FIGS. 1 and 2 the motor is carried on mounting plates 12 and 14 secured to a cylindrical motor housing 16, which housing separates rotor-stator assemblies 18 and 20 and provides support therefor. Rotor-stator assembly 18 comprises a pair of stator halves 22 and 24 circumferentially enclosing a rotor 26 secured to one end of a torsion shaft 30. Assembly 20 comprises a pair of stator halves 32 and 34 enclosing a rotor 36 that is secured to the other end of the shaft 30. The shaft 30 is journaled in bearings such as ball bearings 45 and 46 supported from bearing housings 47 and 48, respectively, the housings forming the ends of the motor. Stator halves 24 and 32 are secured to the motor housing 16 by any convenient means such as the screws 49; stator halves 22 and 34 are, in turn, secured to stator halves 24 and 32, respectively, by some convenient means such as cap screws 50 aided in alignment of the parts with dowel pins 51. The bearings 45 and 46 may be suitably retained in the housings 47 and 48 by means of clips 52 and 53.

The rotor-stator assemblies 18 and 20 in the FIGS. 1 and 2 motors are magnetic exciter units, having a single time phase electrical circuit and a single time phase magnetic circuit. The FIGS. 1 and 2 motors include a coil 60 contained by stator halves 22 and 24, and a coil 61 contained by stator halves 32 and 34, the stator halves 22 and 24 being separated at their pole face ends by an air gap 62 with stator halves 32 and 34 having a like air gap 63. In the FIGS. 1 and 2 motors, each rotor is provided with 24 equally spaced rotor teeth on the outer periphery thereof to match with 24 companion stator teeth on the inner periphery of the associated stator. The 24 teeth rotor-stator construction (as labeled by the 24 alphabet letter designations $a$, $b$, $c$, through $v$, $w$, $x$ in FIG. 2) provides an angular spacing of 15 degrees between teeth; other constructions of motors according to the present invention may, for example, include 64 teeth with a spacing of five and a fraction degrees or may include any whole number of teeth.

The magnetic flux path for the rotor and stator halves at the end of the motor where output shaft 28 is located consists of a circular path that includes stator half 24, the air gap between stator half 24 and rotor 26, the rotor 26 itself, the air gap between rotor 26 and stator half 22 and stator 22 itself. A given stator half, such as stator half 24, assumes a single magnetic polarity, for example North, throughout its periphery during motor actuation, there being no division of stator teeth into alternating North and South poles as in other stepping motor embodiments. Each coil such as coils 60 and 61 in the FIGS. 1 and 2 motor comprises a single electrical circuit with a number of wire turns; the coils are located in the recessed space provided in the stator halves, the ends of the coil being brought out in the form of lead wires 70 and 71 and connected to a terminal block 72 in the FIGS. 1 and 2 motor. An exciter apparatus such as that described in FIGS. 7B, 8B, 9A, 9B, 9C and 10A of the drawings is shown and identified with the number 75 in FIG. 2, this exciter apparatus being connected by lead wires 73 and 74 to the motor of FIG. 2.

Figure 3A:
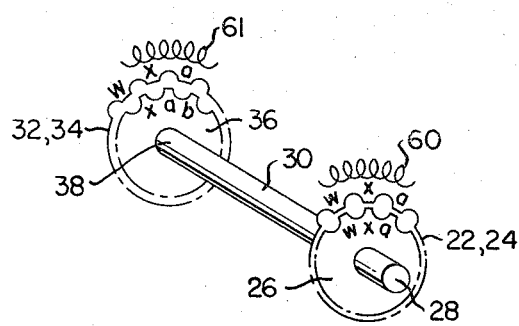
FIG. 3 (including views 3A to 3F) is a diagrammatic view of a stepping motor made according to the present invention and showing several rotor-stator relationships occurring during stepping action thereof.

FIGS. 3A to 3F of the drawings show a sequence of operation involving the capturing, holding, and releasing of motor rotors by the stators during stepping operation of a motor which is constructed according to the present invention. FIG. 3A shows an initial or quiescent condition of the motor in a position wherein the teeth of rotor 26 at shaft end 28 are aligned with the teeth of stator halves 22 and 24; in the FIG. 3 views of the motor the numbers 22 and 24 designate both halves of the complete stator located at the shaft end 28 of the motor, these halves being represented by the single stator indicated at 22, 24. At the time when the teeth of rotor 26 at shaft end 28 are aligned with the teeth of stator 22, 24, the teeth of rotor 36 at shaft end 38 are misaligned by substantially one-half of a step position or 180 electrical degrees so that the teeth of stator 32, 34 as seen by tooth $a$ of rotor 36 is located between tooth $a$ and tooth $x$ of stator 32, 34; the misaligned condition being manually established during assembly of the motor with the aid of equipment such as an assembly jig and locating pin means.

Figure 3D:
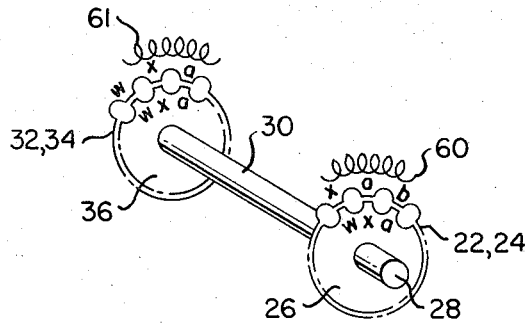
Figure 3B:
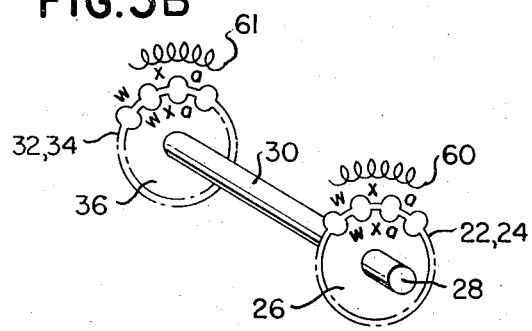

When power is applied to the coil 60 of the motor in FIG. 3A, the teeth of rotor 26 are held in the illustrated position, aligned with the teeth of stator 22, 24 in a capturing manner and the torsion shaft 30 is in a relaxed state. After coil 60 is first energized, power is later applied to coil 61 and the teeth of rotor 36 are attracted to and become aligned with the teeth of stator 32, 34, in a capturing manner as seen in FIG. 3B; tooth $a$ being aligned with tooth $a$, tooth $x$ with $x$, etc. In the FIG. 3B illustration of the motor wherein both coils 60 and 61 of the motor are energized, the torsion shaft 30 is in a "wound-up or twisted" condition. In this position, the motor is ready for its first stepping motion.

Figure 3E:
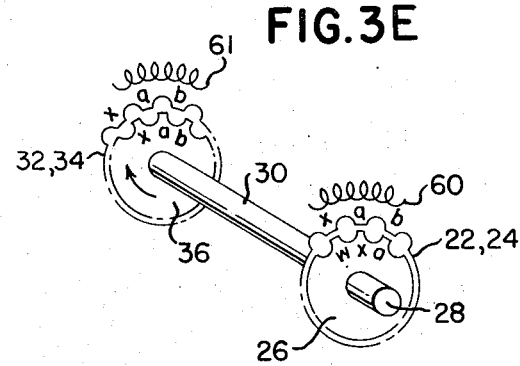
Figure 3C:
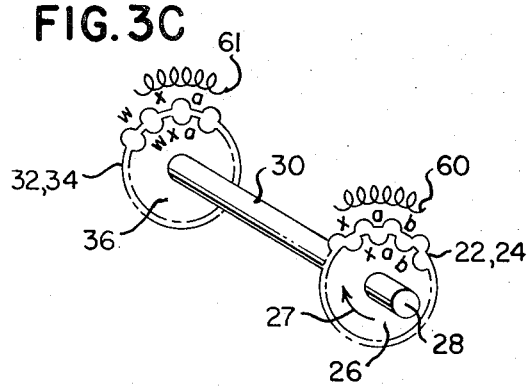

Stepping motion may be commenced in the FIG. 3B motor by de-energizing either coil 60 or coil 61 to release the distorted torsion shaft 30 from its wound-up status. If coil 60 is released, the rotor 26 starts rotating clockwise with its teeth moving away from the matching teeth of the stators 22, 24 as the shaft 30 unwinds, as shown in FIG. 3C. At some point after the centerline of a rotor 26 tooth moves near or past the centerline between teeth of stator 22, 24 (FIG. 3C), the coil 60 may again be energized so that magnetic force between rotor and stator attracts the teeth of rotor 26 to the next set of stator 22, 24 teeth. Following the attraction as seen in FIG. 3D, rotor 26 tooth $a$ becomes locked in alignment with stator tooth $b$, rotor tooth $x$ with stator tooth $a$, and rotor tooth $w$ with stator tooth $x$. During this movement into the new position commencing with de-energization of coil 60, the wound-up condition of the torsion shaft 30 is relaxed as the shaft end 28 accelerates in a clockwise direction; when the shaft end 28 has rotated to the point where a tooth of rotor 26 moves past the centerline between teeth of the stators 22, 24, the shaft end 28 begins decelerating by reason of the shaft again going into a twisted or wound-up condition. Depending upon the type of loading impressed upon the motor and the speed of motor operation, coil 60 may be re-energized at a point near the time when the centerline of a rotor 26 tooth is aligned with the centerline between teeth of stators 22, 24 or at a point when the centerline of a rotor 26 tooth has become almost perfectly aligned with the centerline of a stator 22, 24 tooth.

Figure 3F:
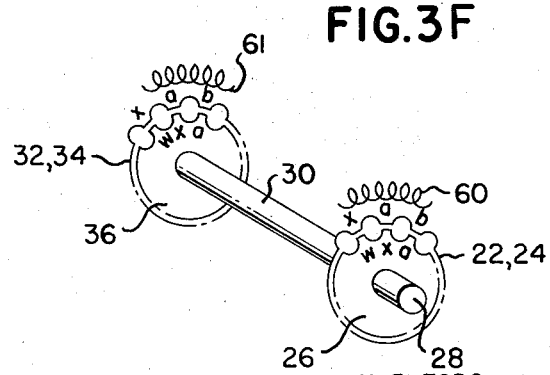

Following rotation of the rotor 26 into the new aligned position, the opposite coil, coil 61 is de-energized and the distorted torsion shaft 30 is again released bringing about a condition where the teeth on rotor 36 move in a clockwise direction relative to the stator 32, 34 as the torsion shaft 30 unwinds. Again, at some point near or after the centerline of teeth on rotor 36 move past the centerline between teeth on stator 32, 34, as shown in FIG. 3E, coil 61 is re-energized and magnetic attraction causes the teeth of rotor 36 to lock on the next adjacent stator teeth, as seen in FIG. 3F. With tooth $a$ of rotor 36 being aligned with tooth $b$ of stator 32, 34 and the successive teeth aligned as shown, the torsion shaft 30 is wound up again and the output end 28 of the shaft 30 is ready for the next stepping action. The alternate application of power to the coils 60 and 61, to obtain acceleration and deceleration of the shaft ends and rotors into the next tooth position with the resulting torque being built-up and then released within the shaft, accomplishes a stepping action at the shaft output end. If a point near the center of torsion shaft 30 is considered as a reference, the motion of the motor may be compared to the act of a person walking, since the motor motion consists of a first rotor being held immobilized while the second rotor is advanced from a lagging to a leading position followed by the second rotor being held immobilized while the first rotor is advanced from a lagging to a leading position. The sequence of capturing, holding, and releasing the rotor by means of energizing and de-energizing the respective electrical coils provides for energy storage in the torsion shaft 30 as is explained later in this specification. The acceleration, deceleration, and locking action of a motor built according to the invention are sure and positive by reason of every rotor tooth being aligned with a respective stator tooth while the motor is in an energized condition. The motor is capable of producing large output torque per unit of rotor inertia since every rotor tooth is acted upon by magnetic flux and no rotor teeth are inactive or reserved for use in a later time phase or in starting the motor. The torque-to-inertia ratio is large for the motor because the rotor magnetic flux is largely confined to the rotor teeth area and need not enter the central region of the rotor which may therefore be made very small and light in weight.

ENERGY RELATIONSHIPS DESCRIPTION

Previous attempts to combine two incremental motion rotary magnetic exciters and a torsional element have not been successful primarily because the energy losses in the incremental motion rotary magnetic exciters, located at the torsional element ends, were relatively large with respect to the quantity of energy which could be stored by the torsional member; the large energy losses thereby serving to effectively mask the energy storage benefits which are possible in such a combination. In working with the embodiments of the present invention, it has been found that the possible sources of energy loss in the motor are so large as to make the amount of energy storable in the torsional member insignificant and impotent with respect to motor operation if special energy conservation provisions are not made. A major portion of the notable success of the present invention motor can be attributed both to an early realization of the magnitude these energy loss mechanisms can assume, and to an approach that was found for curtailing energy losses in two areas of the motor. In the present part of this specification, the energy loss mechanisms are described along with preferred embodiment descriptions of the apparatus overcoming these energy losses; this section of the specification also includes an operating description of the motor in terms of the energy flow into, within, and out of the motor.

In describing FIG. 3C of the drawings in the preceding mechanical portion of the specification, it was mentioned that electrical excitation for coil 60 is removed at one point in the motor operating cycle in order to permit the wound-up torsion shaft member 30 to relax and thereby accelerate rotor 26 in the clock-wise direction indicated by arrow 27. From an energy viewpoint, this acceleration of rotor 26 involves transferring a quantity of potential energy from the rotationally distorted torsion shaft member 30 into the rotor 26 where the energy is converted into kinetic energy that is vested in motion of the rotating mass of rotor 26. In essence, the potential energy stored in torsional shaft member 30 is converted into kinetic energy which moves rotor 26 over a period of time during the interval following release of rotor 26 by coil 60. The efficiency with which energy stored in torsional shaft member 30 can be converted into kinetic energy in rotor 26 is important in motors made according to the present invention for several reasons:

1. With efficent energy transfer, the energy available at output shaft 28 end of the motor is not limited to that quantity which may be transmitted into the motor via coil 60 but may also include energy transmitted into the motor via coil 61; the use of two input coils having advantages insofar as motor inertia, heat dissipation, magnetic saturation and coil electrical time constants are concerned.

2. When energy can be efficiently stored and transmitted between rotors of the motor, as shown in FIG. 3, it is unnecessary to provide for the generation of starting torque in either of the rotary magnetic exciters of the stepping motor; the freedom from rotor poles that are needed only for starting torque generation allows the motor to have lower rotational inertia and also provides for higher output torque in a given physical motor size since all of the included motor poles are utilized for torque generation and no poles are reserved for use in sequential time phases of motor operation. The combination of rotor 26 and rotor 36 also adds useful load driving torque to the output available from the motor shaft 28. In other words, with efficient energy transmission via torsion shaft member 30, rotor 36 adds both starting torque capability and work driving torque to the characteristics of rotor 26.

3. If energy can be efficiently transmitted via torsion shaft member 30, the output torque at shaft end 28 of the FIG. 3 motor is mathematically predictable with precise accuracy for at least one portion of the operating cycle of the motor. During the operating cycle portion when rotation of shaft end 28 is induced by the unwinding of torsional shaft member 30, the output torque available from shaft end 28 is entirely controlled by resilient characteristics of the torsion shaft member 30 and the motor's internal inertia; since these characteristics may be precisely measured or calculated from the properties of the shaft and rotor, the motor output torque is predictable with precision for at least this torsion shaft driven portion of the operating cycle.

4. If energy can be efficiently transmitted between rotor 36 and rotor 26 via torsion shaft member 30, then a combination of friction and inertia load applied at shaft end 28 may be considered as having its inertia portion driven by torque from the torsional shaft member 30, and its frictional component driven by rotor 26; although this division of load driving torques is something less than mathematically rigorous, it is important in some practical situations since it may be possible to regard torque from the torsion shaft member 30 as having accelerated the load at shaft end 28 up to some rotational velocity before magnetic torque from rotor 26 is applied. The sequential appearance, at shaft end 28, of a known predictable spring torque followed by a magnetically derived motor torque may allow desirable mathematical calculation of load performance in some motor spplications.

5. If energy can be efficiently transmitted between rotor 36 and rotor 26 via torsion shaft member 30, then reversal of the motor rotation direction involves only selecting between first releasing rotor 36 and first releasing rotor 26 when the torsion shaft 30 is in the distorted condition shown in FIG. 3B of the drawings. In a business machine application of the motor, for instance, direction reversal of the motor involves nothing more than logic signal manipulation to select which of coils 60 and 61 is first de-energized following the storage of potential energy in torsion shaft member 30.

The efficient transmission of energy from rotor 36 to rotor 26 via torsion shaft member 30 is found to involve two classes of energy loss mechanisms. The first of these loss mechanisms is attributed to molecular friction or torsional hysteresis within the torsion shaft member 30 itself. This torsional hysteresis is similar in nature to the major energy loss mechanism which prevents a steel ball bearing, when dropped from a height of six feet to a concrete floor, from bouncing higher than five and a fraction feet upon the first bounce. If there were no mechanical hysteresis (or windage or other energy loss mechanisms) acting on the ball, all of the kinetic energy vested in the ball bearing just prior to impact with the concrete floor would be returned to the ball and it would be driven to the original point of departure during rebound. In the torsional shaft member 30 of FIG. 3, if there were no molecular friction and mechanical hysteresis losses in the torsion shaft member 30, (and no wind losses present) then the energy imparted into torsion shaft member 30 by a mechanical twisting of rotor 36 through an arc of nine degrees would rotate rotor 26 through an identical arc of nine degrees upon rotor 26 being released from a hold position. The presence of molecular friction and mechanical hysteresis in even the best of the practically available materials for torsion shaft member 30, precludes a nine degree rotation of rotor 36 from inducing a nine degree rotation in rotor 26.

In the present invention, it has been found desirable to use a special class of materials in the fabrication of torsion shaft member 30 to minimize the losses from molecular friction and mechanical hysteresis in the motor; among the materials which have been found successful for this fabrication is the family of steels which are known as electrode type steels and especially the steel which is known as American Iron and Steel Institute No. 52100 (AISI 52100) ball bearing steel. When AISI 52100 ball bearing steel is employed, it has been found that a torsion shaft member 30 having a length to diameter ratio near 16 to 1 is satisfactory from both an energy loss and from a fatigue resistance view-point when employed in a stepping motor having nine degree step increments.

Other materials have been successfully employed for fabricating a satisfactory torsion shaft member 30 in some applications; among these materials are the alloys of titanium and the alloys of aluminum, such as those employed in mechanical tuning forks. Aluminum alloys have some disadvantages for the torsion application, in that they have a relatively low torsional fatigue stress; on the other hand, titanium alloys may permit a lower length to diameter ratio for the torsion shaft member 30.

So long as the energy losses from molecular friction and mechanical hysteresis are maintained within desirable limits, other materials and other shapes for the torsion shaft member 30 may be practical in some uses of the motor; for instance, the torsion shaft member 30 may be replaced with a coil spring or with an organic resilient member or by some combination of a leaf spring or straight-pull coil spring and a lever mechanism.

The second class of energy loss mechanism involved in transmitting energy from rotor 26 to rotor 36 via torsion shaft member 30 involves the events surrounding the release of rotor 26 from magnetic engagement with stator 22, 24, when coil 60 is de-energized. It has been found that three energy loss events are active during rotor release, that is while the magnetic flux coupling rotor tooth x to stator tooth x in FIG. 3B of the drawings, is being removed from the motor, two of these energy loss events involving magnetic hysteresis and electrical eddy currents which are known in the electrical machinery art. In the present invention, it is believed that most of the energy dissipated by magnetic hysteresis and electrical eddy current at de-energization of coil 60 comes from the electrical inductance of coil 60 and that only a small fraction of such loss is supplied by energy stored within the torsion shaft member 30. The third energy loss event which is active upon de-excitation of coil 60 in FIG. 3B arises from generator action occurring when the distorted torsionally resilient shaft 30 unwinds following release of rotor 26 by a slowly decreasing magnetic field, the magnetic field decrease in an inductive circuit being inherently relatively slow with respect to the mechanical time constant of the torsionally resilient shaft and its inertia load. The third energy loss event may be explained by examining the components in FIG. 3B. Prior to the release of rotor 26 by coil 60, the torsion shaft member 30 is wound up or distorted and rotor tooth w on rotor 26 is aligned with stator tooth w of stator 22, 24; in this condition the torque from torsion shaft member 30 is opposed by torque from the magnetic flux coupling between aligned rotor and stator teeth. At some time after energization is removed from coil 60, the magnetic flux holding rotor 26 stationary against the torsional force from torsion shaft member 30 will have decreased to a sufficient degree that the torque from torsion shaft member 30 is greater than the magnetic torque exerted on rotor 26, and while in this condition rotor 26 will begin to rotate. Since the magnetic flux, remaining after rotation of rotor 26 commences, does not decay instantaneously, but rather over an appreciable period of time, a time that is measured in milliseconds and is a function of the electrical inductance of coil 60, the initial rotation or rotor 26 is not free but is restrained by the remaining magnetic flux between rotor 26 and stator 22, 24. Even though the magnetic flux established by coil 60 continues to decrease as rotor 26 continues to move, the time which elapses before the moving rotor 26 is completely free of magnetic flux retardation may be quite long, even longer than the time required for torsion shaft member 30 to rotate rotor 26 through a full tooth position. In many cases, therefore, it can be stated that the entire motion of rotor 26, between successive tooth-aligned positions, is rotation which is retarded by the decaying magnetic flux from coil 60, where precautions are not observed to quickly remove the magnetic flux established by coil 60 from the motor.

It might be said that the decaying flux from coil 60 has only a delaying effect upon the rotation of rotor 26 since the torsion shaft member 30 is capable of storing potential energy for any time period and will in fact store its retained potential energy until the restraining force from the magnetic flux has decreased sufficiently to allow the rotor to proceed with its rotation; in other words it could be asserted that rotation of rotor 26 does not in fact occur until the magnetic flux has decayed to a sufficient degree. In lieu of the decaying flux from coil 60 merely delaying rotation of rotor 26, however, it is found that this flux actually absorbs a significant fraction of the potential energy stored in torsion shaft member 30 and serves as a means for conducting this potential energy out of the motor structure and into electrical resistances and other loss mechanisms. The energy removing ability of the decaying magnetic flux may be appreciated by realizing that any movement of rotor 26 by torsion shaft member 30 that does not result in increasing the velocity of rotor 26 represents potential energy within the torsional shaft member 30 being lost and not converted into kinetic energy vested in rotor 26, that is, if rotor 26, during the unwinding of torsion shaft member 30, moves between two points A and B without realizing an increase in rotor velocity, then potential energy is being lost from the motor.

To preserve the potential energy that is stored within torsion shaft member 30 for desirable uses within the motor and its mechanical load, and to prevent loss of this potential energy, by way of magnetic flux coupling with the moving rotor, it is necessary that the magnetic flux from coil 60 be removed as quickly as possible once the coil 60 is separated from its source of driving energy; that is, an instantaneous decay of the flux established by coil 60 is desirable.

Rapid removal of the magnetic flux established by coil 60 involves treating two components of flux; one of these components relates to the energy stored in the air gap of the motor between rotor 26 and stators 22, 24; that is, coil 60 being an electrical inductance has magnetically stored within its air gap a quantity of energy which may be expressed according to the mathematical formula $E = \frac{1}{2} LI^2$, where E represents Energy, L represents inductance and I represents current flowing in inductance L. According to magnetic theory, this energy is stored in the air gap of the inductance or in the flux threading between rotor and stator poles of the motor. Removal of the flux associated with the magnetic inductance of coil 60 therefore involves removing from the magnetic circuit a quantity of energy by way of an electrical dissipating element connected to the terminals of coil 60.

In addition to the magnetic flux resulting from energy stored in the inductance of coil 60, there is also a component of flux linking rotor 26 with stator 22, 24, which is based upon residual magnetism within the ferromagnetic structure of rotor 26 and stator 22, 24. This residual magnetism component of flux can be described by referring to FIG. 10C of the drawings.

In FIG. 10C there is shown a set of coordinate axes 457 and 459, representing respectively flux density B and magneto-motive force H; on these coordinate axes there is impressed a magnetic hysteresis curve of the type that is descriptive of a ferro-magnetic structure such as rotor 26 and stator 22, 24. In the curve of FIG. 10C, the point labelled 461 might represent the operating condition of the ferro-magnetic structure of the motor shown in FIG. 3C during energized excitation of coil 60; upon removal of energization from coil 60 in FIG. 3C, the flux in the magnetic structure would relax back to the point 463 in FIG. 10C. At the point 463, there is zero magneto-motive force (H=0) applied to the motor structure. Even though there is zero magneto-motive force applied to the ferromagnetic structure at point 463 in FIG. 10C, there is yet remaining a considerable quantity of magnetic flux in the magnetic structure of the motor, as is represented by the vertical distance between the coordinate axis origin and the point 463, the distance identified as 462 in FIG. 10C. Removal of the magnetic flux represented by the point 463 of FIG. 10C, requires that some reverse magneto-motive force be applied to coil 60. The necessary reverse magneto-motive force is identified by distance 465 along the H axis of FIG. 10C. Upon application of the reverse magneto-motive force represented by the distance 465, the flux within the magnetic structure of the motor will fall to the point labelled 467 in FIG. 10C. Point 467 represents a flux density near zero, zero flux density being that value which will provide negligible restraining force against the motion of rotor 26 by torsion shaft member 30.

A complete removal of the magnetic flux which links rotor and stator members of the stepping motor in FIG. 3 requires that both the residual magnetism component of the flux and the electrical inductance energy related component of the flux be considered and that the sum total of these components be reduced to zero magnitude as quickly as possible following removal of energization from the coil 60 or 61. On electrical circuit capable of performing both the inductance energy removal from coil 60 or 61 and the reverse magneto-motive force excitation of coil 60 or 61 and performing these events in rapid automatic sequence is described in the electrical description section of this specification.

When the motor of FIG. 3 is operated in a manner that permits efficient energy transfer from one rotor to the other rotor by way of energy storage in the torsion shaft, operation of the motor may be described in terms of energy flows as follows:

FIG. 3, including views 3A through 3F, is used again in describing stepping motor energy flow. In FIG. 3A, a motor is shown with rotor 26 magnetically engaged with stator 22, 24 and with coil 60 energized to maintain the rotor-stator engagement. Rotor 36, in FIG. 3A, is shown with the rotor teeth being mis-aligned with the stator teeth by one-half of a stepping position or by 180 electrical degrees; in this condition, coil 61 is de-energized and torsion shaft 30 is relaxed. If electrical energy is applied to coil 61 so that magnetic flux is established therein, rotor 36 is caused to rotate into the position shown in FIG. 3B, wherein its teeth are also aligned with the teeth of its adjacent stator 32, 34. During this alignment process, a portion of the electrical energy supplied to coil 61 is transduced by the incremental motion rotary exciter which includes stator 32, 34, and rotor 36 into mechanical energy and this mechanical energy is stored in the form of potential energy within the torsion shaft member 30. In other words, a portion of the electrical energy supplied to coil 61 is transduced into rotational mechanical energy vested in rotor 36 and from thence into potential mechanical energy vested in the opposing resilient force of torsion shaft member 30. As the motor is shown in FIG. 3B, the potential energy stored within torsion shaft member 30 is ready for release at one of the motor rotors; this release occurs in the events depicted in FIG. 3C of the drawing wherein the rotor 26 has been released by removing excitation from coil 60 and the potential energy stored within torsion shaft member 30 is accelerating rotor 26 in the clockwise direction, indicated by arrow 27. The acceleration of rotor 26 from an energy viewpoint amounts to potential energy within torsional shaft member 30 being transferred into rotor 26 in the form of kinetic energy.

When rotor 26 reaches the point of rotation indicated in FIG. 3C, wherein a center line of the rotor poles is aligned with the center line between stator poles, all of the potential energy stored within torsion shaft member 30 has been removed therefrom and is now vested in rotor 26 in the form of kinetic energy. The kinetic energy of rotor 26 tends to carry rotor 26 into a succeeding pole aligned condition as shown in FIG. 3D of the drawings. Since the energy transfer from torsion shaft member 30 into rotor 26 is less than 100 percent efficient, and since there are energy losses in the motor and its load, the kinetic energy vested in rotor 26 is not capable of carrying rotor 26 into the fully aligned succeeding step position shown in FIG. 3D but is only capable of carrying it near to this perfectly aligned position. At some point after the rotor has reached the position shown in FIG. 3C of the drawing, or even slightly before the rotor reaches the position of FIG. 3C, coil 60 is again energized and an additional quantity of energy is thereby transduced into rotor 26 to carry it into the perfectly aligned position shown in FIG. 3D. Both the kinetic energy which carried rotor 26 away from the misaligned position of FIG. 3C toward the aligned position of FIG. 3D, and a portion of the energy added to the rotor 26 via coil 60 as the rotor 26 neared the perfectly aligned position, are stored in torsion shaft member 30 while the motor is in the condition shown in FIG. 3D; that is, the torsion shaft member 30 in FIG. 3D contains both a quantity of energy derived from rotor 36 and an additional quantity of energy added via coil 60 and rotor 26. In this condition, as shown in FIG. 3D, the torsion shaft member 30 is again prepared for the release of a rotor being vested with the potential energy which will induce rotation of a released rotor.

Since the quantity of energy stored in torsion shaft member 30 in FIG. 3D is substantially the same quantity of energy as was stored in torsion shaft member 30 in FIG. 3B, it is clear that the energy which was supplied via coil 60 in moving rotor 26 into alignment as shown in FIG. 3B is essentially that quantity of energy needed to overcome energy losses in the motor and its load, that is, the kinetic energy of rotor 26 is supplemental to the extent needed to rotate rotor 26 against torque from the torsion shaft member 30 into the aligned condition of FIG. 3D by energy supplied from coil 60. Rotation of rotor 26 from the position shown in FIG. 3B to the position shown in FIG. 3D may be compared with the action of a torsional pendulum wherein the potential energy stored in a torsion shaft is converted into kinetic energy of a rotating mass. The motor of FIG. 3 supplements the torsional pendulum concept by adding a quantity of energy with each torsional oscillation that is sufficient to maintain a constant aptitude of torsional oscillation in the motor rotors.

In FIG. 3E of the drawings, the potential energy which was stored in torsion shaft member 30 in the FIG. 3D drawing has been released by de-energizing coil 61 and is being transferred into rotor 36; as rotor 36 approaches the condition shown in FIG. 3F, coil 61 may again be energized to supply an addtional quantity of energy to the torsion shaft 30 and carry rotor 36 into the fully aligned position of FIG. 3F.

The best moment for re-energizing coils 60 and 61 during the rotor movement conditions of FIGS. 3C and 3E is dependent upon several factors including the type of load impressed on the motor, the motor operating speed, the type of electrical driving circuit used to excite coil 60, and the mechanical and electrical time constants of the motor. It is clear that once the moving rotor 26 approaches the position shown in FIG. 3C (the position of 180 electrical degrees mis-alignment of rotor and stator), with the rotor moving and vested with kinetic energy, that flux from coil 60 may be applied without danger of drawing rotor 26 back into the preceding alignment condition of FIG. 3B, since the inertia of rotor 26 will carry it into the succeeding step position shown in FIG. 3D. It is also true, however, that premature application of flux from coil 60, before rotor 26 reaches the 180 electrical degrees mis-alignment position, will retard the motion of rotor 26 and will be inefficient from an energy viewpoint; such premature flux application can also result in rough and noisy operation of the motor.

Depending on the amount of frictional and inertia loading impressed on the motor, the time delay between coil excitation and flux establishment and several other factors, coil 60 in one extreme will be re-energized very late in the rotation of rotor 26 so that flux from coil 60 essentially does little more than lock rotor 26 in its attained position of alignment as shown in FIG. 3D, whereas in the other extreme condition, coil 60 will be re-energized as the rotor nears the 180 electrical degrees mis-alignment position so that energy is supplied to rotor 26 over a longer period of time. In any event, it is desirable that coil 60 be re-energized at such a rate and with such peak value of energization that there not be a grossly excessive amount of kinetic energy vested in rotor 26 at the time it reaches the condition of perfect alignment shown in FIG. 3D. If rotor 26 has a grossly excessive amount of kinetic energy over and above that quantity needed to rotate into the aligned condition of FIG. 3D, the excess energy will be dissipated in the form of mechanical oscillations of rotor 26 about the aligned position of FIG. 3D and will be dissipated in the form of heat in the ferromagnetic parts and the electrical exciting circuitry of the motor since oscillations about an aligned condition, as in FIG. 3D, induce large flux changes and large voltage changes in winding 60. The energy flow path coupling rotor 26 and external electrical dissipation elements is described in the electrical portion of this specification.

In summarizing the energy description of a stepping motor made according to the following invention, it may be said that the motor applies an elaborate sequence of excitation steps to control energy flow into and out of coils 60 and 61 in order that the relatively small quantity of mechanical potential energy stored in torsion shaft member 30 may be preserved and usefully employed. Since the steps performed to quickly release rotors 26 and 36 from the magnetic flux of coils 60 and 61 are in themselves wasteful and dissipative of energy, as is explained in the next topic of this specification, the overall energy efficiency of a motor made according to the present invention is not high; that is, the motor of this invention, in an attempt to preserve the needed and useful small quantity of torsional shaft member energy is wasteful of larger quantities of electrical energy. In many motor applications, it has been found that overall efficiency is a secondary consideration as compared with the desirable operating performance.

Throughout the specification and claims of the present application for letters patent, several names are employed in referring to components of the stepping motor; the torsion shaft member is for instance variously called the torsion shaft, the torsion shaft member, and the torsionally resilient coupling member; in similar fashion, the energy transducer devices located at each end of the torsion shaft member are variously called incremental motion rotary magnetic exciters, rotary exciters, stepping motors and electrical to mechanical energy transducers. In similar fashion, the electrical windings which magnetically energize the torsionally resilient coupling member are variously called coils, windings, electrical windings, and turns.

ELECTRICAL DESCRIPTION

In FIG. 10A of the drawings there is shown an electrical circuit which may be employed to energize the incremental motion rotary magnetic exciter located at one end of the torsion shaft member 30 shown in FIG. 3 of the drawings. In the FIG. 10A circuitry, the electrical winding 411 corresponds to one of the exciter coils 60 and 61 of the FIG. 3 drawing.

The circuitry of FIG. 10A includes electrical winding 411, connected with two electrical inductance coils 399 and 431, and two electrical switching elements such as transistors 407 and 439, a source of electrical energy 427 which is connected via terminals 395, 425 and ground terminals 409 and 410 to the transistors 407 and 439 and to electrical resistance elements 397 and 429. The transistor devices 407 and 439 in FIG. 10A are controlled as to their ON or OFF state by signals applied to the base electrodes via terminals 473 and 441.

FIG. 10B of the drawings shows an electrical waveform such as may be encountered during transient operation of transistor 407 or 439 in FIG. 10A; the waveform of FIG. 10B consisting of a period of rising voltage 443, a period of stable voltage 447 and a period of falling voltage 449 together with time indications as to the duration of significant portions of the waveform at 451 and 453.

FIG. 10C of the drawings, which was described earlier in this specification, represents a magnetic hysteresis curve such as may exist for the ferromagnetic structure associated with the incremental motion rotary magnetic exciter electrical winding 411 in FIG. 10A.

The manner in which the circuitry of FIG. 10A causes the ferromagnetic structure associated with winding 411 to be excited and to undergo a rapid decrease in magnetic flux coupling once de-energized may be described in terms of the electrical energy relationships that are well known for an electrical inductance coil. This description is conveniently commenced by assuming that the circuit of FIG. 10A was excited at some previous time and has been allowed to remain in the steady state excited condition until all currents and voltages appearing therein are stabilized. In this steady state, stabilized condition with transistor Q1, 407 in the conducting state, and transistors Q2, 439, in the non-conducting state, a current labelled $I_f$ and flowing as indicated by arrow 421 will pass through resistor 429, inductance coil 431, winding 411, and transistor 407. Typically for one embodiment of the invention, the current $I_f$ may be in the order of five amperes where voltage 427 is in the order of plus 48 volts, the inductance of winding 411 is near 3 millihenrys, the inductance of coils 399 and 431 is near 30 millihenrys and the resistance of resistors 397 and 429 is a value between 0 and 8 ohms. Resistors 397 and 429 are given such value as will limit the steady state current in the inductance coils 399 and 431 to a predetermined amplitude.

With the steady state current $I_f$ flowing in the FIG. 10A circuit, the voltage developed across inductance coil 431 has the polarity shown by the plus and minus signs 433 and 435 respectively with the top end terminal of inductance 431 being positive with respect to the bottom end terminal. In the case of coil 411, the right hand end terminal is positive with respect to the left hand end terminal as shown by the plus sign 415 and the minus sign 413. During the steady state interval, a current is also established in inductance coil 399 and resistor 397, this current is labelled $I_L$ and is indicated by the arrow 423 in FIG. 10A. Both the current $I_L$ and the current $I_f$ flow into circuit node 405 and thence into the switching element represented by transistor 407 and thence to the ground terminal 409; in other words, a total steady state current of ten amperes flows in the electrical switching element 407 for the FIG. 10 embodiment of the invention. The steady state current condition for the circuit of FIG. 10A represents that condition which exists when the rotor associated with winding 411 is being held in magnetic engagement with the associated stator, this steady state condition being also similar to the condition existing when a rotor is being re-attracted to a position of stator engagement following a release and movement of the rotor. The events following a steady state rotor holding consist of turning OFF the switching element which has been ON, i.e. transistor Q1, 407 and turning ON the opposite switching element; i.e. transistor Q2, 439; wherein, in the FIG. 10A circuitry, this produces the effects described as follows.

When the electrical switching element transistor Q2, 439 is turned ON, the steady state current $I_f$ 421 is diverted from the path flowing through winding 411 into a path passing through electrical switching element 439. The removal of current $I_f$ from winding 411 produces an instantaneous change of voltage polarity across winding 411 as the energy which has been stored in the inductance of winding 411, attempts to maintain the current $I_f$ flowing in the windings. Maintenance of current $I_f$ is in accordance with the well known properties of an electrical inductance coil, that of maintaining a previously established current flow within itself so long as magnetically stored energy is available to sustain the flow. The instantaneous change of polarity of the voltage across winding 411 tends to raise the voltage at circuit node 405 to some positive value as is indicated by the portion 443 of the waveform shown in FIG. 10B, the instantaneous polarity of the voltage across winding 411 now being that indicated by the symbols 417 and 419.

Interruptions of the path by which current $I_L$ 423, has been flowing through electrical switching element transistor 407 produces an instantaneous change of voltage polarity across inductance coil 399, the new polarities for inductance coil 399 being indicated by symbols 404 and 402, this change of polarity being also according to the previously mentioned behavior of an electrical inductance coil having an interruption of a steady state current flow. Since both the electrical energy stored within winding 411 and that stored in inductance coil 399, tend to place circuit node 405 at some positive potential upon interruption of the steady state current path through switching element transistor 407, there are in reality two sources of energy causing the previously mentioned rise shown by region 443 of the FIG. 10B curve. In the absence of a voltage limiting mechanism, acting on node 405, the voltage at node 405 will increase to some high value even as high as several thousand volts as a result of the energy stored in winding 411 and inductance coil 399.

Transistor Q1, 407 in addition to serving as a switching device, also acts as a voltage limiting mechanism during the interval of high voltage appearing at circuit node 405. The amplitude to which transistor Q1 will allow the voltage on circuit node 405 to rise is dependent upon the secondary breakdown characteristics of the transistor junction employed in the circuit at the Q1, 407 position. The 2N3773 transistors specified in FIG. 10A have a secondary breakdown characteristic tending to limit the voltage at circuit node 405 to about 160 volts, when a current of 10 amperes is flowing.

Since both the winding 411 and the inductance coil 399 obey the fundamental relationship of $V = L\, di/dt$, where V is the voltage developed across an inductance L that is incurring a current change at the rate of $di/dt$, both the rate at which current can change in winding 411, and the rate at which energy can be withdrawn from the inductance of winding 411 and therefore the rate at which magnetic flux between motor rotor and stator can be removed, are dependent upon the magnitude of the voltage allowed at circuit node 405. If a transistor device having a higher voltage secondary breakdown characteristic than the 2N3773 is employed at the Q1, 407 position, the energy removal process will occur more quickly than in the 150 microsecond interval indicated at 451 in FIG. 10B. Power transistor devices of the NPN type are available with a reverse voltage rating higher than 160 volts, however, these transistors may not be appropriate for the present invention since the voltage developed at node 405 will readily exceed any reverse voltage breakdown capability found in a power transistor not designed for operation as an energy dissipating device in the secondary breakdown mode of operation. The 2N3773 has a secondary breakdown energy dissipating characteristic which is relatively high in voltage rating considering the present state of the transistor art. The energy dissipation which occurs in transistor Q1, 407, represents a change in magnetic flux within the ferromagnetic structure associated with electrical winding 411 from the point 461 to the point 463 on the magnetic hysteresis, B-H curve of FIG. 10C.

Although the transistors employed as electrical switching elements 407 and 439 limit the voltage appearing at circuit node 405 to a value near 160 volts, it is significant to realize that this 160 volt limitation may in fact permit more rapid discharge of the energy stored in winding 411 than would a mechanical switch device wherein energy stored in the winding inductance would be dissipated in the form of an electrical arc. The voltage developed across an established electrical arc wherein there are ionized molecules of metal and high temperature gases provides a current flow path that may have lower electrical impedance than that of the 2N3773 transistors operating in 160 volt secondary breakdown dissipation mode.

During the 150 microsecond portion 477 of the curve shown in FIG. 10B, energy is being extracted from both electrical winding 411 and inductance coil 399 and is being dissipated in the secondary breakdown action of transistor Q1, 407; the duration of this enregy dissipating period, that is the length of the curve position 447 in FIG. 10B being dependent upon the amount of energy stored in winding 411. For instance, where the voltage across transistor Q1, 407 is the previously mentioned 160 volts and the inductance of winding 411 is 3 millihenrys, and the initial winding current is 5 amperes, the instantaneous rate of change of current, $di/dt$, is near fifty three times $10^3$ amperes per second and the energy stored within winding 411 should be discharged in about 100 microseconds of time. Following discharge of the energy stored within winding 411, the current in transistor Q1, 407, decreases from the ten ampere value which prevailed while both inductance coil 399 and winding 411 were feeding current into node 405 to some current value near five amperes; the decrease in current flow in transistor Q1, 407, resulting in a decreased voltage across the transistor Q1, as is shown by the portion 449 of the curve in FIG. 10B.

One of the important features of the FIG. 10A circuit is that by selecting inductance coil 399 to have an inductance much larger than that of the winding 411, there is sufficient energy stored within the inductance coil 399 following complete discharge of winding 411 to permit energy from inductance coil 399 to immediately and automatically establish a reverse current in winding 411. This reverse current is effective to overcome the residual magnetism component of flux in the ferromagnetic structure associated with winding 411 and to move the operating point of the ferromagnetic structure in the motor from point 463 in FIG. 10C to point 467. The desirability of this reverse current energy storage is one of the major purposes for including inductance coils 399 and 431 in the circuit of FIG. 10A.

It is to be noted that resistance element 397 removes energy from inductance coil 399 during both the period when transistor Q1, 407 is removing energy and also during the period when inductance coil 399 is providing reverse current in winding 411; however, so that the combination of energy removal by resistance 397 and transistor 407 do not prematurely exhaust the energy available from inductance coil 399, it is necessary that consideration be given to the relative quantities of energy stored and the energy dissipating rates of the circuit components. In the FIG. 10A embodiment of the circuit where a 48 volt power source is used, it has been found satisfactory to provide an inductance of about thirty millihenrys or ten times the inductance of winding 411 for the inductance coils 399 and 431.

Several features make the circuit in FIG. 10A particularly desirable for driving the torsional stepping motor of the present invention. Among these features are the following:

1. The circuit establishes pre-existing currents which are merely diverted or steered from their established path in a circuit node, such as nodes 437 and 405 in FIG. 10A, into the windings of the torsional stepping motor, pre-established current steering being in lieu of the usual motor energizing technique of closing an electrical circuit and waiting for the current to attain a desired value. In a load which includes an inductive device, such as winding 411, the use of pre-established currents that are regulated by a larger inductance element is a speed increasing factor. 2. The circuit of FIG. 10A employs the energy storing capability of an auxiliary electrical inductance coil, i.e. coil 399, to collect over a long period of time the energy needed during transient energization events for the load winding 411; the energy release characteristics of the storage inductance coil 399 being almost ideally suited for the excitation needs of an inductive load member such as winding 411. 3. The circuit insofar as load windings 411 are concerned acts as a constant current generator, that is, it provides current having a magnitude substantially independent of the voltage appearing across load winding 411. As a result of the energy storing capability of the inductance coils 399 and 431, the total power supply energy which must be dissipated to achieve the constant current characteristic is much less than would be the case if conventional constant current circuits employing large voltages and high series resistances or dynamic constant current generators were employed to excite winding 411. 4. The circuit of FIG. 10A ideally meets the fast flux reversal demands of winding 411 by providing both a high voltage energy dissipating medium and a high voltage source of reverse current for overcoming residual magnetic flux in the motor ferromagnetic structure; conversion between action as an energy dissipating means and action as a source of energy for the reverse magnetic flux being automatic with the circuit and occurring precisely at the time instant when energy has been exhausted from load winding 411. Immediately following dissipation of the magnetic energy stored in winding 411, the pre-established voltage across transistor Q1, 407 generates in winding 411 a reverse current for overcoming residual magnetism in the ferromagnetic structure of the stepping motor; this reverse current representing a diversion of some energy from inductance coil 399 from the dissipation mechanism of transistor Q1, 407 into winding 411. 5. The circuit of FIG. 10A combines the required energy dissipating element and the required electrical switching element into a single structure having particularly desirable electrical properties, wherein dissipation occurs under constant voltage conditions rather than under the slower constant resistance conditions. 6. The circuit of FIG. 10A provides for the reversal of a five ampere current flowing in a highly inductive circuit and accomplishes this reversal in tenths of a millisecond rather than in the customary period of several milliseconds. 7. By means of the filtering action of inductance coils 399 and 431, the circuit of FIG. 10A provides a power supply load that is free of the switching and heavy current transients normally associated with a stepping motor; the load presented by a stepping motor operated in conjunction with the circuit of FIG. 10A is so nearly constant and free of transient conditions that operation of the stepping motor and the sensitive logic and amplifying circuitry of a business machine from the same power supply is possible. 8. The energy dissipating capability vested in elements of the FIG. 10A circuit, such as resistors 397 and 429, is large enough to provide good damping for the stepping motor associated with winding 411. Oscillation of a rotor about an attained stepping position terminates rapidly when the stepping motor of the present invention is driven by the circuit of FIG. 10A because the electrical damping provided by resistors 397 and 429 rapidly dissipates the mechanical energy promoting the oscillation. The mechanical oscillation energy is coupled into resistors 397 and 429 by the large changes in magnetic flux occurring in rotor and stator poles of the motor during relative movement of a nearly aligned rotor and stator pole pair. The resistors 397 and 429 may be either lumped resistive elements or the inherent resistance of inductance coils 399 and 431, depending upon the physical properties of the selected inductance coils. 9. The circuit of FIG. 10A may be utilized with transistors other than the 2N3773 and similar devices having secondary breakdown operating capability by connecting an energy dissipating element between node 405 and the ground terminal 409 and also between node 437 and ground terminal 410; this energy dissipating element may be in the form of a zener diode or an electrical resistance, it being realized that an electrical resistance will not provide the constant voltage energy dissipation characteristic shown in FIG. 10B and will therefore provide a somewhat slower removal of energy from winding 411. 10. The electrical filtering action of inductance coils 399, and 431, precludes the necessity of exciting the stepping motor associated with winding 411 with a well regulated and filtered source of direct energy. Any power supply ripple and voltage transients present at terminals 395 and 425 of the FIG. 10A circuit will be largely removed by the inductance of coils 399 and 431 and will therefore not influence the operating torque of the stepping motor associated with winding 411. 11. Energy dissipated by the circuit of FIG. 10A emanates from convenient energy dissipative devices such as transistors 407, 439 and resistors 397 and 429; these dissipative devices may not require forced air cooling or other cumbersome energy handling apparatus despite the relatively large quantities of energy rejected from the overall stepping motor since such devices are commonly cooled with natural convection and large surface area structures. 12. The circuit of FIG. 10A provides a convenient means for assuring that the ferromagnetic structure associated with winding 411 is always driven to an operating point very close to the point of zero residual magnetic flux, that is, close to the point 467 in FIG. 10C, during the reverse current period. The circuit of FIG. 10A permits precise attainment of the operating point 467 by allowing accurate termination of the reverse current period wherein energy from inductance coil 399 counteracts the residual magnetism flux in the stepping motor. Since current in winding 411 does not build up instantaneously, controlling the magnitude of the reverse current and, hence, the amount of reverse magnetomotive force applied to the motor requires only termination of the reverse current following an appropriate time interval. Termination of the reverse current in the FIG. 10A circuit is accomplished by returning transistor Q1, 407 to the ON state.

In FIG. 7B of the drawings, there is shown a schematic diagram wherein the conduit of FIG. 10A is incorporated into a practical stepping motor driving environment. The FIG. 7B drawing includes two arrangements resembling the basic circuit of FIG. 10A, each one of these circuits being applicable to the rotary magnetic exciter located at one end of the stepping motor.

In the circuitry of FIG. 7B, the electrical resistance elements 397 and 429 of FIG. 10A are not shown; since these resistance elements are required only in the case where inductance coils 399 and 431 in FIG. 10A have low inherent D.C. resistance, it is assumed that the inherent resistance of the inductance coils 136, 149, 159, and 169 shown in FIG. 7B is sufficiently large to preclude the need for external resistance elements.

The stepping motor portion shown at 135 in FIG. 7B consists of a torsionally resilient shaft member 157 having at the ends thereof rotor members 145 and 165 with the stator members being magnetically energized by winding 141, labelled winding E, and winding 163, labelled winding A. The stepping motor of FIG. 7B also includes four inductance coils, 136, 149, 159 and 169, labelled LE1, LE2, LA1 and LA2, respectively, and four electrical switching elements 139, 153, 161, 171, labelled Switch 1, Switch 2, Switch 3, and Switch 4, with the junction between inductor 136 and switching element 139 being labelled as node 137 and the junction between inductor 149 and switching element 153 being labelled as node 151, and with winding 141 being connected between node 137 and 151 and with a similar arrangement of inductors, switching elements and coil connections applying for rotor 167 and winding 163. Excitation power for the stepping motor at 135 of FIG. 7B is supplied by direct current electrical energy applied between terminal 147 and ground terminal 155 with terminal 147 being 48 volts positive. Electrical switching elements 139, 153, 161 and 171 are drawn as bi-polar NPN power transistors in FIG. 7B, each of these transistors having an emitter electrode connected to ground terminal 155, a collector electrode connected to one of the inductors 136, 149, 159 and 169, and an unconnected base electrode; circuitry for connection with the base terminals of these transistors being described in a later portion of this specification. The waveforms 183, 185, 197, and 201, shown at 177 in FIG. 7A define the "on" or conducting intervals and the OFF or non-conducting intervals for the electrical switching elements 139, 153, 161, and 171 respectively. The electrical significance attached to the waveforms 183, 185, 197, 201 is shown at 205, 207 and 209 in FIG. 7; the labels at 205 indicating that current flows in one of the two motor windings 141 and 163 during all intervals of the stepping cycle. At 207, on FIG. 7A, the physical significance of winding current flow in terms of motor action is identified, while at 209, in FIG. 7A, the overall cycles of motor operation occurring for associated groups of the waveforms at 177 are identified.

The arrows 173 and 175 of FIG. 7 define the direction of forward current flow in each of the motor windings 141 and 163; as shown by waveforms 185 and 197. A large part of the motor operating cycle is composed of time wherein these forward currents flow, that is, forward current flows in winding 141 so long as electrical switching element 153 is in the ON condition as shown by waveform 185 and electrical switching element 139 is in the OFF condition, as shown by waveform 183, with a similar relationship existing for forward current in winding 163 and waveforms 197 and 201.

A description of events depicted in FIG. 7A and 7B commences with a period of time during which both rotor 145 and rotor 165 of the motor are being held in a step aligned condition; this period being represented by the waveforms to the left of time marker 179 in FIG. 7A. Commencing at time marker 179, electrical switching element 171 is turned ON and electrical switching element 161 is turned OFF. As indicated at 205, these events terminate the flow of forward current in winding 163 and set up the conditions for reverse current to flow in winding 163 in order that rotor 165 be released from its magnetic engagement with stator 167. During the time interval 199, which is a portion of waveform 197, in FIG. 7A, electrical switching element 161 is in the OFF condition, while electrical switching element 171 is in the ON condition. During this portion of the operating cycle the energy stored in inductance 159 induces reverse current in winding 163 and thereby frees rotor 165 for acceleration under the influence of the previously wound up torsion shaft member 157. Following the time interval 199, in waveform 197, there is a short time interval during the remainder of time interval 203 in waveform 201 wherein both electrical switching element 161 and electrical switching element 171 are in the ON condition. During this interval of time, no external current flows into winding 163 by reason of the fact that both ends thereof are connected to ground terminal 155 and no potential difference is developed across the winding terminals. As shown at 207, the time interval 199 may be considered a period wherein rotor 165 is released from its engagement with stator 167, while the remaining period of time interval 203 may be considered the time wherein rotor 165 is allowed to rotate under the influence of torsional shaft member 157; the actual point at which rotation of rotor 165 commences may lie either ahead of or after the ending of time interval 199.

Following the end of time interval 203, electrical switching element 161 is in the ON condition while electrical switching element 171 is in the OFF condition; these being the conditions for forward current flow in winding 163 and for the re-establishment of magnetic flux which will attract rotor 165 in its newly attained rotational position and hold it in this newly attained position while rotor 145 is being released and rotated into a new position by the events commencing at time 181, these events including time intervals 187 and 189 in waveforms 183 and 185, respectively.

The broken line at 191, FIG. 7, indicates that the holding of rotor 145 may continue for an indefinite period of time in the situation where signals applied to this stepping motor call for termination of the stepping events with that rotation of rotor 145 which commences at time marker 181; it is, of course, true that stepping motion in the motor may be halted following rotation of either one of the rotors 145 and 165, so that the broken line indication at 191, FIG. 7, might well appear to the left of time marker 181 to indicate the condition wherein rotation of the motor was to cease following a rotation of rotor 165. As the events, commencing at time marker 193 and time marker 195, FIG. 7, indicate any number of stepping cycles wherein rotor 145 and rotor 165 move alternately according to the cycle described above may be imposed upon the stepping motor; the motor may rotate continuously for any desired number of complete revolutions each of which is composed of plural stepping events as described with reference to FIGS. 7A and 7B.

The operating sequence and the labeling shown in FIGS. 7A and 7B imply that both windings 141 and 163 are to remain energized during long periods of motor quiescence; however, maintaining both windings 141 and 163 in the excited condition offers an advantage in placing the motor in condition for an immediate starting of a subsequent stepping act and it is not expressly necessary in view of the fact that holding either one of these windings energized will sufficiently define a stepping location for most load requirements. In applications of the stepping motor where electrical power conservation is important, the motor may be halted with only one of its windings energized and with the other winding de-energized and with the torsion shaft member 157 in a relaxed condition. The first operation following a holding period wherein only a single stepping motor winding has been energized, is, of course, to re-energize the de-energized winding and rotationally distort the torsion shaft member 157; this step being unnecessary where the motor is quiescently held with both windings energized and the torsion shaft member 157 distorted.

FIGS. 7A and 7B of the drawings have formally related events, occurring in the electrical circuitry portion, of a stepping motor built according to the present invention and corresponding to the events occurring within the motor itself. On the other hand, FIG. 10 of the drawings including parts 10A, 10B and 10C describes the transient electrical phenomena occurring in the FIG. 7B circuit.

Figure 8A:
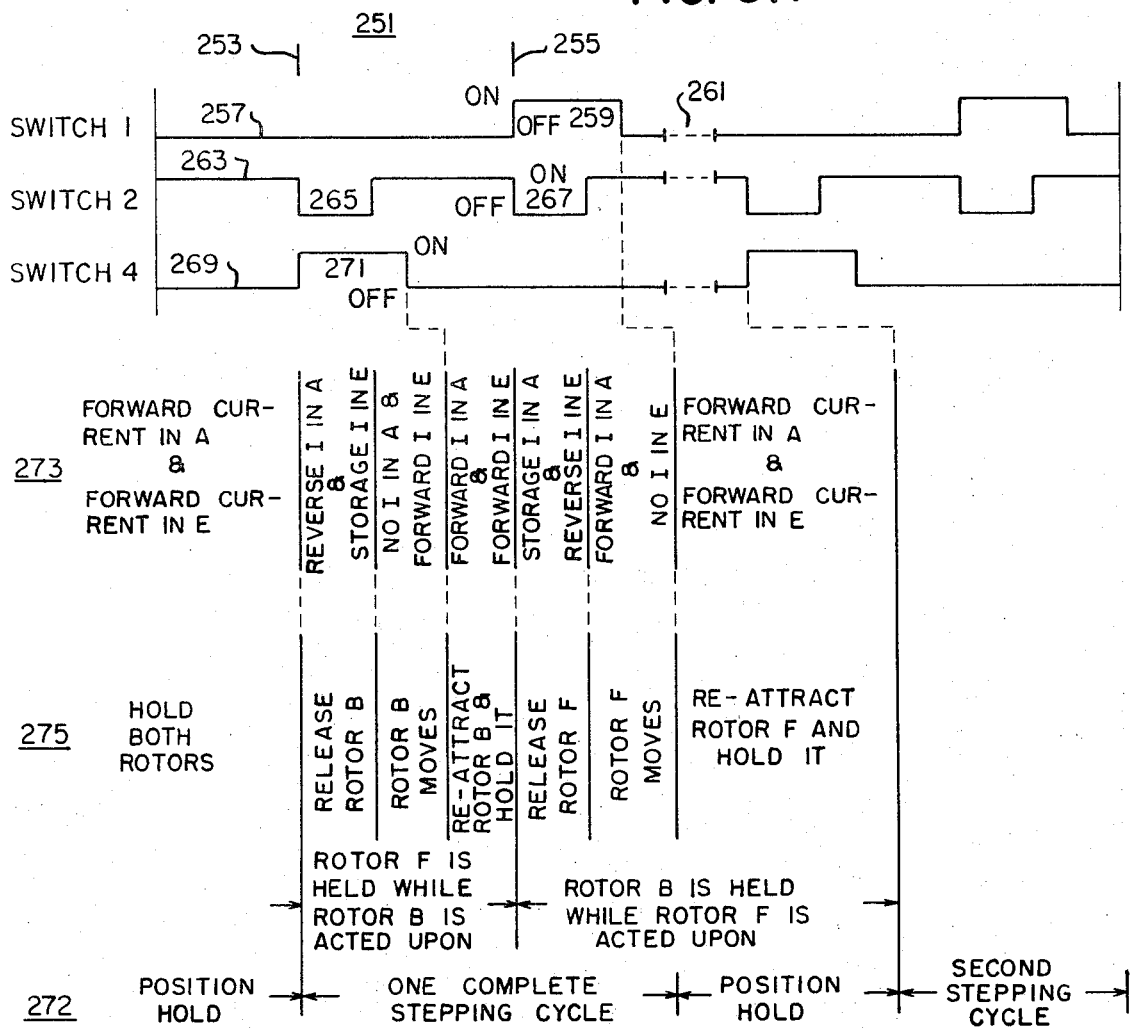
FIG. 8 (including views 8A and 8B) is a second electrical schematic and waveform diagram describing an excitation circuit for stepping motors made according to the present invention.

FIG. 8 in the drawings shows another circuit which may be employed for energizing a torsional stepping motor made according to the present invention; the circuitry of FIG. 8 being similar in structure and operation to the FIG. 7 circuit; the major difference being that transistors 153 and 161, which were shown in FIG. 7, have been combined into transistor 237 in FIG. 8 and inductance coils 149 and 159 in FIG. 7 have been eliminated in FIG. 8. The circuit of FIG. 8 consists of two electrical energy storage inductance coils 217 and 245 connected with the electrical switching elements 221 and 249 in the manner which has already been described for FIG. 7 and FIG. 10. The circuit of FIG. 8 also includes two stepping motor windings 227 and 240, shown as windings E and A, respectively, terminals 215, 223 for connecting the circuit to a source of direct current electrical energy, an electrical switching element 237 connected to the junction between the stepping motor windings, representative portions of a torsional stepping motor including stator 229 associated with winding 227, rotor 231 associated with stator 229, torsionally resilient shaft member 235, stator 241 associated with rotor 243, and winding 240.

The waveforms shown at 251 in FIG. 8 describe operation of the electrical switching elements 221, 237 and 249, in a manner similar to that for the waveforms shown in FIG. 7; the labels at 273 in FIG. 8 define the currents flowing within each of the windings 227 and 240 during the cycle time events described in the waveforms 251. The labels at 275 in FIG. 8 describe the forces which are imposed on the stepping motor rotors during each of the time intervals of waveforms 251 in FIG. 8, while the labels at 272 in FIG. 8 define the complete stepping cycles of the stepping motor.

Operation of the circuit shown in FIG. 8 is very similar to that described with the circuit of FIG. 7; the major difference being that forward current in both winding 227 and winding 240, as defined by arrows 225 and 239, flows into electrical switching element 237 rather than into a separate electrical switching element for each of the forward currents.

Although the reduced number of electrical components required for the circuit of FIG. 8 is desirable from the view of cost and a small stepping motor system, there is some performance degradation in a torsional stepping motor excited by the circuit of FIG. 8. With the FIG. 8 circuit, the performance of one stepping motor is not fully independent of events occurring in the other stepping motor. An interaction between winding 227 and winding 240 in FIG. 8, for instance, occurs in the events near time marker 253 in the waveforms of FIG. 8.

In the time interval preceding time marker 253, both electrical switch element 249 (switch 4) and electrical switch element 221 (switch 1) are in the OFF condition and the forward current in the windings 227 and 240 is summed in node 233 and conducted by switching element 237 to the power source ground return. At time marker 253, electrical switch element 237 is turned OFF while electrical switch element 249 is turned ON with electrical switch element 221 continuing to remain in the OFF condition; this act commencing the sequence for releasing rotor 243. With electrical switching element 237 in the OFF condition, the electrical energy stored in inductor 217 and in winding 227 tends to maintain the current which has been flowing in inductor 217 by supplying magnetically stored energy to the circuitry, this magnetically stored energy inducing secondary breakdown operation in electrical switching element 237 and also supplying energy for overcoming the residual magnetism flux in the ferromagnetic rotor structure associated with winding 227. The fact that energy is removed from winding 227 during the time interval 265 when only electrical switching element 249 is in the ON condition and when rotor 231 is being held motionless amounts to an interaction between ends of the stepping motor in the FIG. 8 circuitry. The supplying of energy that has been stored in the magnetic field of winding 227 during the time interval 265 tends to release rotor 231 from its status of being retained in an engagement with stator 229. Since it is undesirable for any rotation to occur at rotor 231, while rotor 243 is being accelerated and moved into a new position, the use of energy from winding 227 during the time interval 265 is undesirable; and the energy which is dissipated in switching element 237 during the period 265 is preferably supplied only from the inductor 217, which is the condition prevailing in the FIG. 7 version of the circuitry.

It is also characteristic of FIG. 8 circuitry that during the time interval 265 following turn OFF of electrical switching element 237, energy is dissipated in both electrical switching elements 237 and 221. The presence of a fixed voltage at node 219 during this dissipation tends to limit the fraction of the energy dissipated during time 265 which may come from inductor 217 and tends to impose the condition that winding 227 will supply a significant portion of the energy dissipated in electrical switching element 237; this, of course, being detrimental to the retaining force holding rotor 231 in engagement with stator 229.

The circuit of FIG. 8 does, however, offer a performance advantage in addition to the advantages of lower cost and smaller physical size; the circuit of FIG. 8 requiring less energy from the power source than does the FIG. 7 circuit, this fact being based upon the presence of only two energy storage inductors and two pre-established currents in the FIG. 8 circuit, as compared to the four energy storage inductors and the four pre-established currents in the FIG. 7 circuit.

In the FIG. 8 circuit, the events occurring just before and just after time interval marker 255, that is, the events of time periods 259 and 267, are similar to the previously described events at time intervals 265, 271, and 253; that is, each of the rotors in the motor of FIG. 8 tend to be released by the events occurring during the release cycle of the opposite rotor.

In FIG. 8, as in FIG. 7, the symbol 261 indicates that the stepping motor may be operated with any number of rotational increments occurring at alternate ends of the motor as needed for achieving a desired rotational position.

The circuits shown in both FIGS. 7 and 8 provide for rapid release of stepping motor rotors in spite of the relatively high currents required for operating the motors and in spite of these currents existing in a highly inductive circuit, wherein current manipulations are usually accomplished with great difficulty. As has been mentioned earlier for the FIG. 10 circuitry, circuits shown in FIG. 7 and FIG. 8 are capable of achieving complete reversal of currents having a magnitude near five amperes within a few microseconds of time; although this performance is, standing alone, notable in the art of electrical switching, it assumes special merit in the present invention where the relationship between current switching time and mechanical time constant or mechanical resonant frequency of the torsional stepping motor is important. In other words, the important concept in current switching within the coils of the stepping motor of the present invention is that currents be removed and residual magnetism flux be overcome in a time which is short with respect to the rotor motion period which commences when a released rotor is accelerated by the distorted torsion shaft member; it being desirable that complete flux removal occur within just a few degrees of mechanical rotation of a released stepping motor rotor.

As an example of the performance realizable in the circuitry of FIGS. 7 and 8, the electrical time constant of one stepping motor used with the circuitry of FIGS. 7 and 8, that is, the ratio of inductance to resistance for the motor windings in approximately 3 milliseconds of time; these 3 milliseconds being also the time required for the winding current to rise to 62 percent of its final value when the motor is connected to a source of D.C. voltage. To increase the winding current from the 62 percent of final value to a magnitude substantially equaling the final value requires an additional four time constants, or 12 milliseconds of time, this agreeing with the generally accepted principle that an exponential quantity attains final value in five time constants of time. When this same 3 millisecond time winding is excited by the FIG. 7 circuitry, it is found possible to achieve a full current reversal, that is, a charge from plus 5 to minus 5 amperes in approximately 500 microseconds of time. The 500 microseconds current manipulation time compares with a two and one-half millisecond mechanical time required to move a rotor of the excited stepping motor into a newly attained stepping position.

The importance of secondary breakdown operating capability in the electrical switching elements of FIGS. 7, 8 and 10 may be appreciated by considering that immediately following the turn-off of an electrical switching element there is flowing therein a current of ten amperes and there is impressed across the switching element a voltage of 160 volts as a result of this current flow. Under these conditions, the instantaneous power dissipation within the transistors used as an electrical switching element is 1600 watts; moreover, the duration of this 1600 watt dissipation is approximately 150 microseconds, as shown in FIG. 10B. During this 150 microsecond interval, the transistor is called upon to absorb and dissipate substantially one-quarter of a joule of energy. Since transistors which are intended for secondary breakdown operation are characterized by joule ratings, this high instantaneous energy dissipation does not present a problem in embodying the invention.

In describing the circuitry of FIG. 10A, the use of a transistor, such as the illustrated 2N3773, for the electrical switching elements at 407 and 439 has been repeatedly implied; however, while transistors provide an especially convenient embodiment for the electrical switching elements, especially in view of their capability of operating in a high dissipation secondary breakdown mode, it is conceivable that other forms of electrical switching devices could be utilized at 407 and 439 wherein these other devices either inherently embody the dissipation capability of the transistor or have external electrical elements added to provide the dissipating capability. Alternate embodiments of the electrical switching element may include a mechanical switch with the dissipating capability residing in the sustaining of an electrical arc across the opening switch contacts or in a shunting device such as a Selenium diode connected across the mechanical contacts. In some motor applications, the electrical switching element would be a vacuum tube or gaseous device such as an ignition or mercury filled vacuum tube. The switching device may also be a switching semiconductor device such as a silicon controlled rectifier.

In describing the circuitry of FIGS. 7, 8 and 10, the signal applied to the base of the illustrated transistor electrical switching elements, that is, terminals 473 and 441 in FIG. 10A, has been defined in terms of waveforms and ON-OFF times. In FIG. 9 of the drawings, which includes the parts 9A and 9B, there is shown and described an electrical circuit that is capable of providing signals for driving the transistors shown in FIGS. 7, 8, and 10 in the manner shown in the waveforms of FIGS. 7 and 8. The circuitry of FIG. 9A represents an adjustable, laboratory-type wave generator such as may be employed for testing and for performance evaluation of a stepping motor made according to the present invention; and since the circuitry of FIG. 9A employs capacitor discharge circuits for determining time intervals, it is possible that the long term stability and the waveform repeatability it presents will not meet the needs of a sellable product. For such applications, a waveform generator that employs performance sensing of the stepping motor rotor rotation or a stable oscillator circuit may be more desirable as a source of waveforms.

The output signals of the circuit in FIG. 9A are shown together with several waveforms used in generating the output signals in FIG. 9B of the drawings, the output signals being shown at 381, 383, 385, 387, and 389, which are respectively the waveforms previously shown at 177 and 251 in FIGS. 7 and 8. In the FIG. 9B representation of these signals, the time instant 363 which identifies the first waveform transition corresponds with the time instant 355 in FIG. 8 and the time instant 181 in FIG. 7, that is, the waveforms in FIG. 9 commence with a change in the status of driver 1, whereas the waveforms in FIGS. 7 and 8 commence with a change in the status of drivers 3 and 4. At 389, in FIG. 9B, there is shown a composite waveform which is employed with the three driver configuration as shown in FIG. 8 of the drawings; and as will be described later, the waveform at 389 is the result of logically "ORing" two signals within the circuitry of FIG. 9A.

The circuitry of FIG. 9A is composed of a free-running multivibrator clock generator 281 connected via NAND logic gates 289 and 291, to one shot multivibrators 293 and 295 and connected in turn by NAND gates 297, 301, 303, and 307 and one shot multivibrator 299 OR gate 309 and NAND gate 311, to one shot multivibrators 316 and 315. The output of one shot multivibrator 293 is coupled through NAND gate 313 to terminal 341 for connection with a torsional stepping motor driver circuit, such as driver 4 at 331. The output of one shot multivibrator 295 is connected via NAND gates 315 and 327 to terminal 343 and thence to drive 3 which is identical to driver 4 shown at 331. The output of one shot multivibrator 316 is connected via NAND gates 319 and 329 to terminal 345 for connection with driver circuit No. 2, while the output of one shot multivibrator 315 is connected via NAND gate 321 to terminal 347 for connection to driver circuit No. 1. A latch circuit composed of NAND gates 285 and 287 and driven by switch 283 through NAND gate 284 is connected with NAND gate 289 as are leads 312 and 314 which convey the output of NAND gates 311, 321, respectively, to the input of NAND gate 289.

The information in the form of symbols, equations, and waveforms, given in FIG. 9C at the bottom of FIG. 9A, is helpful in describing operation of the FIG. 9A circuit. The symbols shown in 349 in FIG. 9C comprise a conventional NAND logical gate that has an output equation as shown at 351; this gate requires two true or 1 inputs for a 0 output and requires at least one 0 input for a 1 output. The symbol shown at 355 at the bottom of FIG. 9C, is a logical "OR" element having an output according to the equation shown at 357, the output signal being true for either input signal being true. As shown at 353, in FIG. 9C, the circuit elements employed in FIG. 9A regard the positive level signal as being true, while a signal near zero volts is regarded as being false or logical zero. The symbol at 359, in FIG. 9C, represents a one shot multivibrator of the type which triggers upon receiving a voltage rise, and provides a true or positive level output signal for the duration of the timed interval. The symbol shown at 361 represents a free-running or A-stable multivibrator.

The logical circuits employed in mechanizing the FIG. 9A electrical circuit may, of course, be taken from any of the commercially available logic packages; the particular family selected for one embodiment of the invention employing a NAND gate having two NPN transistors with the second of the two transistors having a grounded emitter terminal and a collector terminal that is connected to the output terminal of the logic gate. In this family of circuits, the first NPN transistor is connected as an emitter follower driving the second NPN transistor and having its base connected to the anode of a plurality of input diodes; this circuit having the property that an unconnected or floating input is regarded as logically true or a 1 signal. This circuit also has the property that any low level input signal, that is, any input signal near the zero volt level will turn the NPN transistors off and produce a high level output signal, in other words, the output signal responds to a change from positive level at any input terminal.

Operation of the circuitry of FIG. 9A is as follows: The free-running multivibrator clock generator 281 provides a continuous sequence of positive going pulses that are used to initiate a motor stepping cycle. Whenever the circuitry of FIG. 9A has completed a previously embarked-upon stepping cycle, signals that are received via the conductors 312 and 314 enable their respective inputs of NAND gate 289 and the system awaits the opening of switch 283 and the setting of logical latches 285 and 287 before passing a pulse from the clock generator 281 into NAND gate 291. Once a pulse is received at the input of NAND gate 291, it is inverted and passed into one shot multivibrators 293 and 295 where the waveforms T1.S and T3.S, shown at 371 and 373 in FIG. 9B, are generated. The waveforms T1.S and T3.S are substantially those needed for controlling driver 4 and driver 3 of the stepping motor. If switches 317, 323, and 325 are all in the open position, then logical NAND gates 313 and 315 pass the output signals from the one shot multivibrators 293 and 295 into drivers 4 and 3 via terminals 341 and 343, respectively. The driver circuits are constructed such that a false or zero voltage signal applied to their input causes current conduction in the motor windings and the energy storage inductance shown at 337 and 339 in FIG. 9A. The driver circuits employed in the preferred embodiment of the invention consist essentially of an inverting stage similar to the NAND logical gate identified by the member 333 and connected with the previously-described NPN transistor at 335.

A second pair of one shot multivibrators 313 and 315 are used to generate the waveforms applied to the drivers that control excitation to the rotary magnetic exciter located at the remaining end of the stepping motor. In the present circuit, which is intended primarily for laboratory use, it was deemed desirable to insert a time delay between the stepping action that occurs at one end of the stepping motor and that occuring at the other end of the stepping motor. This delay is provided by one shot multivibrator 299 of FIG. 9A. The one shot multivibrator 299 is triggered at the fall of one shot multivibrator 295, that is, the delay interval begins with the fall of pulses from one shot multivibrator 295 and produces triggering of the one shot multivibrators 313 and 315 after the delay interval has ensued.

By adjusting the time duration of the one shot multivibrator 299, it is possible to construct the circuit of FIG. 9A in an alternate manner that causes triggering of one shot multivibrator 299 to be accomplished by one of the several waveforms occurring near time mark 363 (FIG. 9B), that is, either of the excursions of waveform 372, or either the excursion of pulse 374 or the clock pulse in waveform 369 may be used to trigger the modified one shot 299. It is especially convenient to commence the action of delay one shot 299 at the termination of pulse 372 or pulse 374, since these pulses may be adjusted as to length without the need for adjusting the delay interval. Commencing the operation of one shot 299 with the fall of the short pulse 374, rather than the longer pulse 372, permits the length of time occurring between the end of pulse 372 and the commencement of pulses 378 and 380 to be made as small as desirable down to zero time, as has been found convenient for some operating conditions of the motor.

The NAND gates 301, 303 and 307, together with capacitor 305, prevents so-called spike pulses from triggering one shot multivibrators 316 and 315. Without these networks, including NAND gates 301 to 307, it was found that spike pulses at the output of one-shot multivibrator 299 could cause double triggering of the one-shot multivibrators 316 and 315.

The switches 317, 320, 323 and 325 provide variations in the output waveforms obtainable from the circuitry of FIG. 9A. If each of the switches 317, 320 and 325 is placed in the closed position, all of the four driver circuits connected at terminals 341, 343, 345 and 347 will be placed in the OFF position so there is no restraining force imposed upon the stepping motor rotor. If switch 320 is opened, driver No. 2 will be placed in a conducting condition and a restraining force imposed upon one end of the stepping motor. In similar fashion, if switch 317 is opened, and there are no pulses received from the one-shot multivibrators preceding switch 317, then driver No. 3 will be placed in a conducting condition and restraining force will be exerted on the opposite end of the stepping motor; switches 317 and 320 are therefore useful during certain setup conditions of the stepping motor, wherein it is desirable to have one or both ends of the motor restrained in a stepping position for a long period of time. Since each of the switches 317 and 320 place one driver in the ON condition and one in the OFF condition, the provision for having all four drivers in the OFF condition requires the addition of switch 325.

Figure 8B:
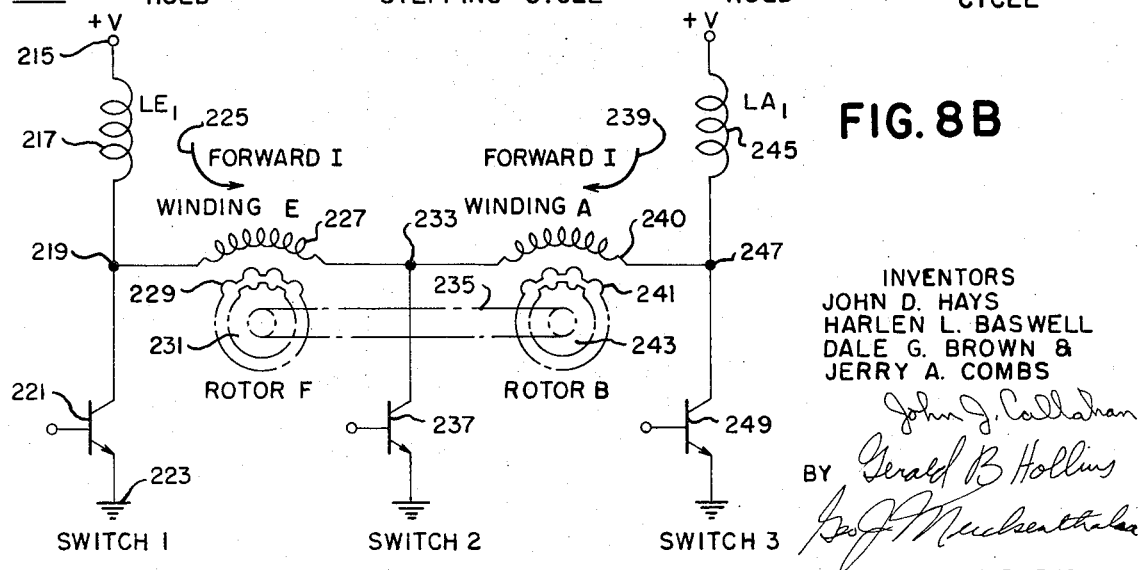

When the circuit of FIG. 9A is employed to drive the three driver motor as shown in FIG. 8 of the drawings, switch 323 of FIG. 9A is closed and the center driver of FIG. 8B, that is, the driver which includes switch 2 of FIG. 8, is connected to terminal 345 and terminal 343 is allowed to remain open. The closing of switch 323 has the electrical effect of tying the collector of the final NPN transistor in NAND gate 319 to the collector of the final NPN transistor in NAND gate 315, a condition which is logically equivalent to saying the inputs of NAND gate 315 (OR) the inputs of NAND gate 319 are either capable of producing a fault signal at the input of NAND gates 327 and 329.

The dotted line 310 in FIG. 9A is placed in the drawing to indicate that some embodiments of the stepping motor invention may not require the delay one-shot multivibrator 299 and its associated circuitry and can perform satisfactorily in the condition where the pulses generated by one-shot multivibrators 315 and 316 commence immediately upon the fall of the output from one-shot multivibrator 295.

MODIFICATIONS TO THE DESCRIBED EMBODIMENT OF THE INVENTION

In the drawings which have been described thus far in this specification, a stepping motor involving two rotors separated by a torsional shaft member has been described. Although this is a useful form for a stepping motor made according to the present invention, there are several modified forms of this basic structure which can be advantageously utilized in some applications of the motor. In the present portion of the specification, several of these modifications are described.

FIGS. 6A and 6B of the drawings show one modification of the basic structure of the stepping motor of the invention which is useful in assuring that the direction of motor rotation is predictable. In FIGS. 6A and 6B, there is shown at 103 a stator assembly and at 123 a rotor assembly and at 121 a torsional shaft member which may be utilized at one end of a stepping motor made according to the present invention. The stator 103 is comprised of a stator housing 119 containing six separate stator pole assemblies, 105, 107, 113, 115, 117 and 118, having electrical windings 109, 114 and 116 magnetically associated therewith. The rotor assembly 123 in FIG. 6A consists of rotor member 129 having rotor poles attached thereto and having an output shaft 125 and a torsional shaft member 121 attached to the end opposite the output shaft with the torsional shaft member being shown in a shortened form as indicated by the broken line 127.

To describe the operation of the stator and rotor members shown in FIG. 6, it is necessary to recall that motivation in a stepping motor made according to the present invention is commenced by first retaining the rotor at one end of the motor in a step aligned or pole engaged position and then distort the resilient torsion bar member by rotating the rotor at the opposite end of the torsion bar into a step aligned condition. Since the previous structural description of the stepping motors of the invention require that rotor-stator pole aligned condition at one end of the stepping motor be as nearly 180 electrical degrees out of phase with the condition of rotor-stator pole alignment at the opposite end of the motor as is possible, a question arises as to which direction of rotation will be selected by the second rotor when it begins rotating away from its condition of 180 degree misalignment. Since the second rotor is in theory located precisely midway between two attracting second stator poles when the first rotor is perfectly aligned in a step condition, its rotation could commence in either direction in at least some of the step-aligned conditions of the motor.

In one embodiment of the present invention, it was found desirable to incorporate second rotor motion sensing apparatus such as a coding disc and photoelectric pickup apparatus in order that direction of the second rotor movement, upon excitation of a winding, may be learned and the appropriate stepping motor end be first released and the desired direction of rotational motion achieved. As was previously noted, it is possible to achieve either direction of load rotation according to which rotor of a pre-excited stepping motor is released first in a cycle of stepping events.

In some applications of the stepping motor where there is extensive logic circuitry already in use along with the power supplies and circuitry associated with sensing amplifiers, the above-described technique of sensing which direction the second rotor did in fact rotate is satisfactory; however, in many applications it is desirable that the direction of motor rotation be predictable in advance and that additional logic circuitry not be required. For these applications, the structures shown in FIG. 6 of the drawings provide a direction of rotation determining method. The essential feature of the structure in FIG. 6 is that the stator poles which engage rotor 129 during step alignment are separated into two or more groups distributed axially along the rotor shaft with the distributed poles being placed in slightly displaced rotational alignment. In the stator, at 103 in FIG. 6, the set of poles 105 and 107 is shown to be rotationally displaced from the set 113 and 115 and also from the set 117 and 118, with the set 113 and 115 being rotationally coincident with the set 117 and 118. In operation of the three sets of poles in the stator at 103, excitation is supplied to the electrical windings 109, 114 and 116 in series or in parallel so that the poles are excited in unitary time phase rather than time displaced phases. With the three separate stators shown at 103 employed at the second rotor end of a stepping motor, and following excitation of the first rotor, the rotor 123 will be located midway between poles of stator assemblies 113, 115, 117 and 118 but located more closely to one set of poles in stators 105 and 107 than to the other set of nearby poles; this closer proximity to one set of stator poles than to the other set producing a net rotational force in the direction of the more closely aligned poles and thereby inducing rotor 123 to move in the direction of the more closely aligned poles.

The lack of perfect alignment between the poles of stator 103 in FIG. 6, of course, decreases the rotational force exerted on rotor 123 to a slight degree; the misalignment of stators 105 and 107 may also slightly change the pole aligned position of the stator 123. Since the rotational force available in a rotor-stator pair may be increased by increasing the excitation current in the electrical windings, and since the change in rotor-stator pole aligned position may be compensated for in manufacturing the stepping motor, overall stepping-motor performance need not be degraded by rotational displacement of the set of stators 105 and 107 in FIG. 6.

For the direction of rotor movement modification and whenever a plurality of stator members, as shown at 103 in FIG. 6, is employed in a stepping motor made according to the present invention it has been found important that the axially adjacent stator poles be made to have the same magnetic polarity as is indicated at 112 in FIG. 6. Were it not for the South to South and North to North alignment of adjacent stator poles, as shown in FIG. 6A, magnetic flux within the overall stator assembly would tend to add along the intermediate portions of the stator assembly and cross the air gap into the rotor assembly only at the extremities of the rotor assembly, that is, at stators 105 and 118 in FIG. 6A; this additional flux tending to by-pass the paths into the rotor existing at stators 113 and 115 to the derogation of the overall torque developed within the motor.

It is, of course, possible for a different number of distinct stator assemblies other than the three shown at 103 in FIG. 6 to be employed and yet have the concept be within the scope of the present invention; in similar fashion it is possible that the rotor 123 may be divided into plural sections, each engaging one of the stators.

Another structural modification to the stepping motor of the present invention is shown in FIG. 11 of the drawings; in this modification, there is shown a motor having three rotors 481, 489, 497 which are connected together by torsion bar members 483 and 491. In the FIG. 11 motor, each of the rotor members is excited by a separate stator assembly, that is by stator 485 which has windings 487 and stator 493 which has windings 495 and stator 499 which has windings 501. The structure of FIG. 11 operates upon the principle that a torsional stepping motor, as described in the present specification, need not be limited to two rotors separated by a single torsional element but may include three or more rotors separated by a torsional element.

When a stepping motor having more than two rotor members is employed such as the three rotor motor in FIG. 11, the stepping position for each of the three rotors is rotationally displaced in a given direction by a successively larger rotational increment from the initial rotor, that is, if rotor 481 and stator 485 are in a step-aligned condition rotor 489 and stator 493 will be misaligned by substantially one-third of a step increment in a clockwise direction and rotor 497 and stator 499 will be misaligned by another one-third of a step position in a clockwise direction. During operation of the motor shown in FIG. 11, each of the rotors is brought into a step aligned condition in a sequence of alignment events and each rotor is subsequently released in a sequence of release events from its step aligned condition with the energy stored within the torsional member 491 being released into rotor 497 and the energy stored within torsional member 483 being released into both rotor 489 and rotor 497. The multiple rotor configuration of the present invention, of course, provides smaller step increments and larger rotational torques than can be provided with similar sized rotors and stators in the two stator configuration, these advantages being realized at the expense of greater electrical complexity and more mechanical parts in the motor assembly.

FIG. 12 of the drawings shows two other modifications for stepping motors made according to the present invention. The drawing of FIG. 12 consists of two stator members 515 and 533 that are associated with two rotor members 521 and 537 having a torsional member 527 connecting the two rotors. The stator 515 in FIG. 12 is excited by electrical windings 517, 523 and 525, which may be located in the space between the poles of the stator assembly in the manner disclosed in U.S. Pat. No. 3,466,518, which patent is assigned to the same assignee as the present invention. The stator 533 is excited by electrical windings 535 which are shown located in the conventional position surrounding the stator pole members. Coupled with the torsional member 527 in FIG. 12 is means for removing rotational energy from the system such as the timing belt 531 and the timing belt pulley 529 which are shown located substantially in the center of the axial length of torsional member 527.

The drawing of FIG. 12 is illustrative of several modification concepts which are pertinent to the present invention. These are as follows:

1. The torsional stepping motor concept is not limited in scope to the use of stepping motors employing the rotary magnetic excitor type of electrical transducer that was described in FIG. 2 of the drawings; that is, the torsion bar stepping motor concept is not necessarily limited to transducers of the excitor class wherein there is a single electrical winding which excites all of the rotor and stator poles in unison, the torsion bar stepping motor concept being equally applicable to the more conventional stepping motor having a different number of rotor and stator poles and a plurality of electrical winding circuits associated therewith.

2. The torsional stepping motor may employ a toroidally wound stator stepping motor such as the one disclosed in U.S. Pat. No. 3,466,518.

3. The torsional stepping motor concept may be applied along with a conventional stepping motor having windings located on the salient protrusion of the stator poles.

4. The electrical to mechanical energy transducers located at each end of a torsional member need not be precisely identical in nature as is illustrated by the different winding configuration for stators 515 and 533, it being important however that the energy transducers located at each end of the torsional element have the same number of incremental positions.

5. Output torque from the torsional stepping motor may be removed from portions of the rotor assembly other than one end extremity thereof, that is, output torque may be removed from any portion of the rotating structure which may be mechanically convenient in a particular embodiment as is suggested by the location of timing belt pulley 529 near the center of torsional member 527.

6. The removal of output energy from a central portion of the torsional element as illustrated by the use of pulley 529 and timing belt 531 offers some potentially useful advantages insofar as driving the stepping motor load is concerned. The motion imparted to pulley 529 by the torsional stepping motor in FIG. 12 will have increments of rotation which are one-half the increments present in either of the electrical to mechanical transducers located at the torsion member ends. The rotational increments of pulley 529 are one-half those of the rotor 521 and the stator 515 with these smaller rotational increments occurring at twice the time frequency of rotor rotational increments.

FIGS. 4 and 5 of the drawings also show a structurally modified stepping motor made according to the present invention; the motor shown in FIGS. 4 and 5 being suitable for more demanding high torque applications. The FIGS. 4 and 5 motor includes a torsional shaft 85 carried within motor housings 86 and 87 and journaled in end bearings 92 and 93. The motor of FIG. 5 has an additional pair of bearings 94 and 95 located at the central ends of the rotors 96 and 97 between the internal ends of stators 98 and 99. The more rugged version of the stepping motor of FIG. 5 is shown in an assembled view in FIG. 4 wherein the electrical leads for the stator windings 100 and 101 are brought out of the motor at the ends as shown at 88, 89, 90 and 91, respectively.

Although the motor of FIGS. 4 and 5 is both functionally and structurally similar to the two stator motors described in the major part of this specification, the extended length of rotors 96 and 97 in the FIG. 5 motor provides larger output torques and more efficient utilization of the axial space along the torsional bar member 85, while the additional bearings 94 and 95 located at the inward end of stators 96 and 97 materially reduce the possibility that the large magnetic forces developed during operation of the motor will radially distort either of the rotors 96 or 97, or the torsional shaft member 85, to a degree permitting tooth contact between rotor and stator members. Since it is desirable that the air gap between rotor and stator members of the motor be made as small as possible for good magnetic flux coupling between these members, the rigid rotor construction permitted by the addition of bearings 94 and 95 becomes important in a practical embodiment of the invention.

The rotor assembly involving rotors 96 and 97, torsional shaft 85 and bearings 94 and 95 is assembled during the manufacturing process to allow sufficient clearance at 102 to assure that stators 96 and 97 do not come in physical contact during motor operation. The stators may be attached to the torsional shaft member 85 by any one of several attachment methods that offer the combination of high torque transmission with low relative motion between rotor 96 and torsion shaft member 85; such methods as shrink fitting by thermal dimensional changes in one or both of the members 85 and 96, mechanical splines, and the use of epoxy adhesives has been employed in fabricating this coupling.

Thus far in the description of the stepping motor of the present invention, a plurality of devices falling within the general classification of electrical to mechanical energy transducers have been described as being appropriate for use at the extremities of the torsion shaft member; these devices including the incremental motion rotary magnetic exciter shown in FIGS. 2 and 3 of the drawings, the toroidally wound stator form of stepping motor as shown at 515 in FIG. 12, and the salient pole stator having magnetic windings on the teeth thereof as shown at 533 in FIG. 12. It is intended that these embodiments of an electrical to mechanical energy transducer device be but symbolic of the several types of transducers which may be employed in fabricating a motor according to the present invention.

Another type of electrical to mechanical energy transducer device that has been successfully employed in a torsional stepping motor is the torque motor as shown in FIG. 13 of the drawings. The torsional stepping motor apparatus of FIG. 13 includes torsion shaft member 550, rotor 552 and a stator 551 located at one end of the torsion shaft member and a torque motor 553 located at the opposite end of the torsion shaft member. In operating the apparatus shown in FIG. 13 of the drawings, the excitation supplied to the torque motor 553 via the electrical leads 554 is made just sufficient to rotate the torsional shaft member 550 through an arc substantially equal to the rotational displacement between stepping positions of the rotor 552 and the stator 551, that is the rotor 552 is locked into position by a magnetically excited rotor 552 and stator 551 and the torque produced by the torque motor 553 is allowed to wind up torsion shaft member 550 to a degree substantially equal to that which was previously described for a stepping motor located at the second end of a torsion shaft member. In FIG. 13, the torque motor 553 is a conventional motor of the A.C. or D.C. type having the capability of operating under stalled rotor conditions for an indefinite time period, this torque motor being used at one end of the torsion shaft member 550. Following wind-up of the torsion shaft 550, the rotor 552 is magnetically released from its retained position and allowed to move into a succeeding step position under the influence of energy stored within the torsion shaft member 550, this energy having been applied to the system via the torque motor 553 and through the stator 551.

In most embodiments of a stepping motor built according to the present invention, the use of a torsion bar as the torsion shaft member connecting first and second rotors of a two-motor stepping motor is desirable; in some applications, however, the length required in a torsion bar member, in order that satisfactory fatigue resistance be provided, may be so large as to be objectionable. Since the resilient coupling member may also be embodied in the form of a torsional coil spring or in the form of a mechanical coupling that employs a combination of mechanical levers and linear resilient devices, such as a spring or other suitable organic material device, the important concept in any of these structures is the use of a material having low mechanical hysteresis energy losses and sufficient mechanical rigidity to maintain close alignment of the two rotors. The torsional coil spring member provides the needed resilience in a coupling positioned in an axial space that is much shorter than that represented in the FIGS. 1 and 3 versions of the stepping motor.

As in the case of most rotational energy transducer devices, the role of the rotor and stator members is but an arbitrary classification as in the stepping motor of the present invention, it being, of course, possible that an embodiment of the invention could be constructed wherein the innermost member of the concentric pair remains motionless and the outermost member rotates on bearings and provides the source of output energy to the rotationally resilient element that couples the motor transducer devices.

The circuitry for controlling excitation to the transducer devices of the present stepping motor invention that was described in FIG. 9 of the drawings is of the free-running or clock-driven pulse generator type that operates the motor in an open loop manner wherein the excitation is independent of motor position or velocity. It is of course possible that a motor made according to the present invention could be operated in a closed loop or a servo system environment wherein the stepping motion is made responsive to a difference between desired and achieved performance of the motor.

SUMMARY

1. The motor of the present invention combines electrical to mechanical energy transducers with an energy storing resilient member in such fashion that the energy transducers complement each other in providing desirable high output torque and motor starting torque.

2. The stepping motor of the present invention provides output torque that is mathematically predictable with great precision over a large portion of its operating cycle.

3. The stepping motor of the present invention operates with minimal disturbance of the voltage appearing at the source supplying the motor.

4. The stepping motor of the present invention operates with minimal step position oscillation, the occurring oscillation being highly damped and of short duration.

5. The stepping motor of the present invention displays notably increased torque output over a similarly sized prior art stepping motor, the improvement being greater than 10 to 1 in one embodiment of the invention.

6. The motor made according to the present invention provides a high ratio of output torque to motor inertia.

What is claimed is:

1. In an improved incremental motion apparatus combination that includes:
first electrical to mechanical energy transducer means including a first rotor means for converting electrical energy into incremental rotation mechanical energy;
second electrical to mechanical energy transducer means, including a second rotor means, for converting electrical energy into incremental rotation mechanical energy;
a source of electrical energy; and electrical exciting means coupled to said source of electrical energy for exciting said first and second energy transducer means; the improvement which comprises:
rotationally resilient coupling means joined at one end thereof to said first rotor means and at the other end thereof to said second rotor means, for torsionally storing and for transmitting between said first and second rotor means, portions of said incremental rotation mechanical energy;
current determining means within said electrical exciting means for establishing from said source of electrical energy a limited flow of electrical current; and
current steering means for steering said limited flow of electrical current alternately into said electrical-to-mechanical energy transducer means or around said electrical-to-mechanical energy transducer means in diversion thereof.

2. An incremental motion apparatus combination as in claim 1 wherein said current steering means includes two electrical switching elements connected with electrical windings in each transducer means and connected to steer either of two limited currents into said transducer means electrical windings in opposite direction therein, whereby current flowing in either possible direction is realized in said electrical windings in each transducer means.

3. An incremental motion apparatus combination as in claim 1 wherein said current determining means includes in the current flow path thereof one or more current magnitude controlling elements capable of establishing, at least temporarily in a transducer means electrical winding, a current that is substantially defined by the current magnitude controlling element and substantially independent of induced voltages in the transducer means windings; whereby current in the transducer means windings can increase from zero to a desired amplitude and direction in a time shorter than the L/R time constant of the transducer means electrical windings, said shorter time also being potentially shorter than the mechanical oscillation period of the combined resilient coupling means and rotor means in said transducer means, following current steering changes in winding excitation.

4. An incremental motion apparatus combination as in claim 3 wherein said current magnitude controlling elements include an electrical inductance coil;
whereby current in the transducer means windings rapidly attains a desired amplitude and direction following current steering acts by virtue of magnetic field energy storage within said electrical inductance coil notwithstanding voltages inductively induced in said transducer means electrical windings immediately following current steering acts.

5. An incremental motion apparatus combination as in claim 4 wherein said electrical inductance coil has an electrical inductance at least five times the inductance of said transducer means electrical windings.

6. An incremental motion apparatus combination as in claim 4 wherein said electrical inductance coil has an electrical inductance near the range of 5 to 10 times the inductance of said transducer means electrical windings.

7. An incremental motion apparatus combination as in claim 2 wherein said electrical switching elements are solid state electronic switching devices.

8. An incremental motion apparatus combination as in claim 7 wherein said solid state electronic devices are bipolar power transistors.

9. An incremental motion apparatus combination as in claim 8 wherein said bipolar power transistors are transistors capable of repeatedly dissipating electrical energy in the secondary breakdown mode of operation.

10. An incremental motion apparatus combination as in claim 3 wherein said current magnitude controlling elements include an electrical inductance coil and said electrical switching elements connected to steer continuously flowing current are transistors.

11. An incremental motion apparatus combination as in claim 1 wherein said current steering means includes two bipolar transistor electrical switching elements and said current determining means includes two electrical inductance coils; with said source of electrical energy, said transducer means electrical windings, said two bipolar transistors and said two electrical inductance coils being connected into a bridge circuit wherein said two electrical inductance coils form upper bridge arms, and said two bipolar transistors form lower bridge arms with said transducer means electrical windings being connected across the bridge between the two junctions of a bipolar transistor and an electrical inductance coil and with the source of electrical energy being connected between the top and bottom points of the bridge between the junction of two inductance coils and the junction of two transistors.

12. An incremental motion apparatus combination as in claim 8 wherein said bipolar transistors are capable of operating at voltages at least three times the nominal operating voltage of said source of electrical energy during an interval when energy stored in the magnetic field of said transducer means electrical windings is being removed therefrom; whereby said magnetic field energy is removed quickly by energy transfer from the electrical windings at a relatively large voltage level and said transistors are capable of repeated acts of dissipation without injury.

13. An incremental motion apparatus combination as in claim 3 wherein said current magnitude controlling element is an energy dissipating non-energy storing element and said source of electrical energy has a voltage potential larger than the resistance voltage drop in the transducer means electrical windings while a predetermined winding current flows therein.

14. An incremental motion apparatus combination as in claim 13 wherein said energy dissipating non-energy storing element is an electrical resistance element.

15. An incremental motion apparatus combination as in claim 13 wherein said energy dissipating non-energy storing element is a multiple port active electronic device.

16. An incremental motion apparatus combination as in claim 1 wherein said current steering means includes open loop, non-rotor rotation responsive logical circuitry means for generating electrical switching means timing signals; whereby incremental movement of said rotor means in said electrical-to-mechanical energy transducer means is governed by bursts of electrical energy supplied in accordance with timing circuitry in said logical circuitry means and without regard for past movements of said rotor means.

17. An incremental motion apparatus combination as in claim 1 wherein both of said electrical-to-mechanical energy transducer means include electrical windings, said source of electrical energy is a direct current source, said electrical exciting means including said current determining means generating from said source of direct current energy two continuously flowing currents having magnitudes when flowing in said electrical windings that are largely independent of voltages developed therein, and wherein said current steering means includes first current steering means for steering one of said continuously flowing currents both into one of said electrical windings and also away from said one electrical winding, second current steering means for steering the other of said continuously flowing currents both into the other of said electrical windings and also away from said other electrical winding, and third current steering means cooperative with said first and second current steering means for steering either one of said continuously flowing electrical currents through both of said electrical windings.

18. An incremental motion apparatus combination as in claim 17 wherein said current determining means are energy storing electrical inductance coils.

19. An incremental motion apparatus combination as in claim 18 wherein said first, second, and third current steering means each include transistor devices.

20. An incremental motion apparatus combination as in claim 19 wherein said source of direct current electrical energy,
said electrical windings, and said transistor devices are connected into an electrical bridge circuit wherein
the upper arms of said bridge circuit each include one of said electrical inductance coils,
the lower arms of said bridge circuit each include a transistor device,
said source of direct current energy is connected across the top and bottom points of said bridge circuit between the junction of said inductance inclusive arms and the junction of said transistor inclusive arms,
said electrical windings being connected in series, with the non-joined end terminals thereof being connected across the horizontal points of said bridge circuit between the two junctions of an electrical inductance inclusive arm and a transistor inclusive arm, and
a third transistor device is connected between the joined ends of said electrical windings and the lower point of said bridge circuit, being therefore connected between the joined ends of said windings and the junction of said two transistor inclusive arms.

21. In a method for actuating an intermittent motion apparatus, of the type including two electrical-to-mechanical transducer devices each having a stator portion with associated electromagnetic windings and an incrementally rotating rotor portion that is joined to the opposite rotor portion by a torsionally resilient coupling member, and including the steps of:
electrically rotating the rotor portion of a first one of the transducer devices into a first rotor incremental position by electrically exciting the electromagnetic windings of the first transducer device;
electrically moving the rotor portion of the second transducer device against torsional force from the resilient coupling member into a nearby second rotor incremental position by electrically exciting the electromagnetic windings of the second transducer device, the torsionally resilient coupling member being thereby distorted through part of a rotor increment in a first rotational direction;
electrically releasing the rotor portion of the first transducer device from the first rotor incremental position under the urging of torsional force from the distorted resilient coupling member, thereby allowing the torsional force to accelerate the first rotor portion away from the first rotor incremental position toward a position of zero distortion in the resilient coupling member and a new first rotor incremental position wherein distortion of the resilient coupling member will be part of a rotor increment and reverse that of said first rotational direction;
electrically attracting the rotor portion of the first transducer device to the new first rotor incremental position by re-exciting the first transducer device; and electrically freeing the rotor portion of the second transducer device from the second rotor incremental position under the urging of torsional force from the distorted resilient coupling member, thereby allowing the torsional force to accelerate the second rotor portion away from said second rotor incremental position toward a position of zero distortion in the resilient coupling member and a new second rotor incremental position wherein distortion of the resilient coupling member is in the first rotational direction;
electrically drawing the rotor portion of the second transducer device to the new second rotor incremental position by re-exciting the second transducer device;

an improved method for electrically releasing and electrically freeing said rotor portions while avoiding during said steps substantial dissipation of the potential energy stored within said resilient coupling member, said improved method comprising the steps of:

establishing within a first electrical energy dissipating element a first energy dissipation rate during said electrically releasing step;

transferring energy stored within the inductance of said electromagnetic windings of said first transducer device into said first electrical energy dissipating element by adding to the energy of said first energy dissipation rate, in said first electrical energy dissipating element, during said electrically releasing step, the magnetic flux stored energy of said electromagnetic windings of said first transducer device;

diverting a part of the first energy dissipating rate energy from said first electrical energy dissipating element into said electro-magnetic windings of said first transducer device following completion of said transferring energy step, continuing the diverting act until residual magnetism flux in said first rotor and stator portions is overcome; whereby said transferring and diverting steps may be accomplished with a single continuous and noninterrupted connecting of said electromagnetic windings of said first transducer device with said first electrical energy dissipating element;

setting up within a second electrical energy dissipating element a second energy dissipating rate during said electrically freeing step;

conducting energy stored within the inductance of said electromagnetic windings of said second transducer device into said second electrical energy dissipating element by adding to the energy of said second energy dissipation rate, in said second electrical energy dissipating element, during said electrically freeing step, the magnetic flux stored energy of said electromagnetic windings of said second transducer device; and steering a part of the second energy dissipating rate energy from said second electrical energy dissipating element into said electromagnetic windings of said second transducer device following completion of said conducting energy step, continuing the steering act until residual magnetism flux in said second rotor and stator portions is overcome;

whereby said conducting and steering steps may be accomplished with a single continuous and noninterrupted connecting of said electromagnetic windings of said first transducer device with said second electrical energy dissipating element;

whereby both the stored energy component of the magnetic flux linking said rotor and stator portions and the residual magnetism component of said linking flux are removed from said transducer devices quickly and before said torsionally resilient coupling member has significantly expended stored potential energy in moving said rotor portions in the presence of decaying magnetic flux.

22. An improved method for electrically releasing and electrically freeing as in claim 21 wherein said acts of establishing a first energy dissipation rate in a first electrical energy dissipating element and setting up a second energy dissipation rate in a second electrical energy dissipating element include developing across said elements a voltage that is larger than the supply voltage employed to excite said transducer devices.

23. An improved method for electrically releasing and electrically freeing as in claim 22 wherein said acts of establishing a first energy dissipation rate in a first electrical energy dissipating element and setting up a second energy dissipation rate in a second electrical energy dissipating element include transferring the energy stored in external inductance coils into said first and second electrical energy dissipating elements.

24. An improved method for electrically releasing and electrically freeing as in claim 21 wherein both of said steps of establishing and setting up are respectively preceded by the step of removing from said transducer device electromagnetic windings a flow of externally derived transducer exciting current.

25. An improved method for electrically releasing and electrically freeing as in claim 21 wherein the method also includes the additional step of:

maintaining said electromagnetic windings in a nonenergized state during a time interval commencing with the termination of said steering and diverting acts following the overcoming of said residual magnetism flux and continuing until said rotor portion has moved substantially toward a succeeding incremental position.

* * * * *